United States Patent
Freeman et al.

(10) Patent No.: US 7,736,006 B2
(45) Date of Patent: Jun. 15, 2010

(54) SUBSTRATE-GUIDED DISPLAY WITH IMPROVED IMAGE QUALITY

(75) Inventors: Mark O. Freeman, Snohomish, WA (US); Karlton D. Powell, Lake Stevens, WA (US)

(73) Assignee: Microvision, Inc., Redmond, WA (US)

( * ) Notice: Subject to any disclaimer, the term of this patent is extended or adjusted under 35 U.S.C. 154(b) by 830 days.

(21) Appl. No.: 11/603,964

(22) Filed: Nov. 21, 2006

(65) Prior Publication Data

US 2007/0159673 A1     Jul. 12, 2007

Related U.S. Application Data

(60) Provisional application No. 60/738,484, filed on Nov. 21, 2005.

(51) Int. Cl.
*G03B 21/28* (2006.01)
*G03B 21/00* (2006.01)
*G02B 5/18* (2006.01)
*G02B 27/42* (2006.01)
*G02F 1/295* (2006.01)

(52) U.S. Cl. ............................ 353/99; 353/98; 353/122; 359/558; 359/572; 385/10

(58) Field of Classification Search ............. 353/98–99, 353/122; 359/13–15, 558, 566, 572, 618, 359/629–633, 636, 639; 345/87, 105–106, 345/108; 349/11, 65; 385/1–4, 7–11
See application file for complete search history.

(56) References Cited

U.S. PATENT DOCUMENTS

| | | | |
|---|---|---|---|
| 3,915,548 A | 10/1975 | Opittek et al. | |
| 4,387,297 A | 6/1983 | Swartz | |
| 4,997,261 A | 3/1991 | Taniura | |
| 5,224,198 A | * 6/1993 | Jachimowicz et al. | 385/133 |
| 5,266,788 A | 11/1993 | Yamazaki | |
| 5,369,415 A | * 11/1994 | Richard et al. | 345/6 |
| 5,465,311 A | * 11/1995 | Caulfield et al. | 385/27 |
| 6,023,372 A | 2/2000 | Spitzer et al. | |
| 6,084,724 A | 7/2000 | Wiegand et al. | |
| 6,129,439 A | 10/2000 | Hou et al. | |
| 6,140,979 A | 10/2000 | Gerhard et al. | |

(Continued)

FOREIGN PATENT DOCUMENTS

EP     0559406     9/1993

(Continued)

OTHER PUBLICATIONS

PCT International Search Report PCT/US2006/045162, Sep. 18, 2007.

(Continued)

*Primary Examiner*—Georgia Y Epps
*Assistant Examiner*—Jori S Reilly-Diakun
(74) *Attorney, Agent, or Firm*—Kevin D. Wills

(57) ABSTRACT

An image-guiding substrate including an image output portion including a plurality of mirrors configured to receive propagated rays and launch the propagated rays toward a viewing region, each mirror having a partial reflectivity of substantially $(1/Y)*[1/(X+1)]$, where X is the number of mirrors remaining to be traversed by a portion of a ray not launched by the mirror and 1/Y is an occlusion.

20 Claims, 10 Drawing Sheets

U.S. PATENT DOCUMENTS

| | | | |
|---|---|---|---|
| 6,166,834 | A | 12/2000 | Taketomi et al. |
| 6,245,590 | B1 | 6/2001 | Wine et al. |
| 6,285,489 | B1 | 9/2001 | Helsel |
| 6,331,909 | B1 | 12/2001 | Dunfield |
| 6,362,912 | B1 | 3/2002 | Lewis |
| 6,384,406 | B1 | 5/2002 | Wine |
| 6,390,370 | B1 | 5/2002 | Plesko |
| 6,404,550 | B1 | 6/2002 | Yajima |
| 6,433,907 | B1 | 8/2002 | Lippert |
| 6,512,622 | B2 | 1/2003 | Wine |
| 6,515,278 | B2 | 2/2003 | Wine |
| 6,515,781 | B2 | 2/2003 | Lewis |
| 6,525,310 | B2 | 2/2003 | Dunfield |
| 6,577,411 | B1 | 6/2003 | David |
| 6,710,902 | B2 | 3/2004 | Takeyama |
| 6,791,760 | B2 | 9/2004 | Janeczko et al. |
| 6,821,457 | B1 * | 11/2004 | Natarajan et al. .......... 252/582 |
| 6,829,095 | B2 | 12/2004 | Amitai |
| 6,833,955 | B2 | 12/2004 | Niv |
| 7,018,044 | B2 * | 3/2006 | Chen et al. ................... 353/31 |
| 7,021,777 | B2 | 4/2006 | Amitai |
| 7,046,892 | B2 * | 5/2006 | Yoshikawa et al. ......... 385/129 |
| 7,158,306 | B1 | 1/2007 | Cobb |
| 2001/0031107 | A1 * | 10/2001 | Bradshaw .................... 385/10 |
| 2002/0126086 | A1 | 9/2002 | Takeuchi et al. |
| 2002/0141026 | A1 | 10/2002 | Wiklof |
| 2005/0253055 | A1 | 11/2005 | Sprague |
| 2006/0132914 | A1 | 6/2006 | Weiss et al. |
| 2006/0291021 | A1 | 12/2006 | Mukawa |
| 2007/0008624 | A1 | 1/2007 | Hirayama |
| 2007/0091445 | A1 | 4/2007 | Amitai |
| 2007/0159673 | A1 | 7/2007 | Freeman et al. |
| 2007/0171328 | A1 | 7/2007 | Freeman et al. |

FOREIGN PATENT DOCUMENTS

| | | |
|---|---|---|
| FR | 2681702 | 3/1993 |
| FR | 2866442 | 8/2005 |
| WO | WO-03/081320 | 10/2003 |
| WO | WO-2005/104566 | 11/2005 |
| WO | WO 2006/085308 | 8/2006 |
| WO | WO-2007/062098 | 5/2007 |

OTHER PUBLICATIONS

Amitai, Yaakov et al., "P-27: A Two-Dimensional Aperture Expander for Ultra-Compact, High-Performance Head-Worn Displays", *SID International Symposium*. Boston MA. May 24-27, 2005. vol. 36 05/24/205 , 360-363.

* cited by examiner

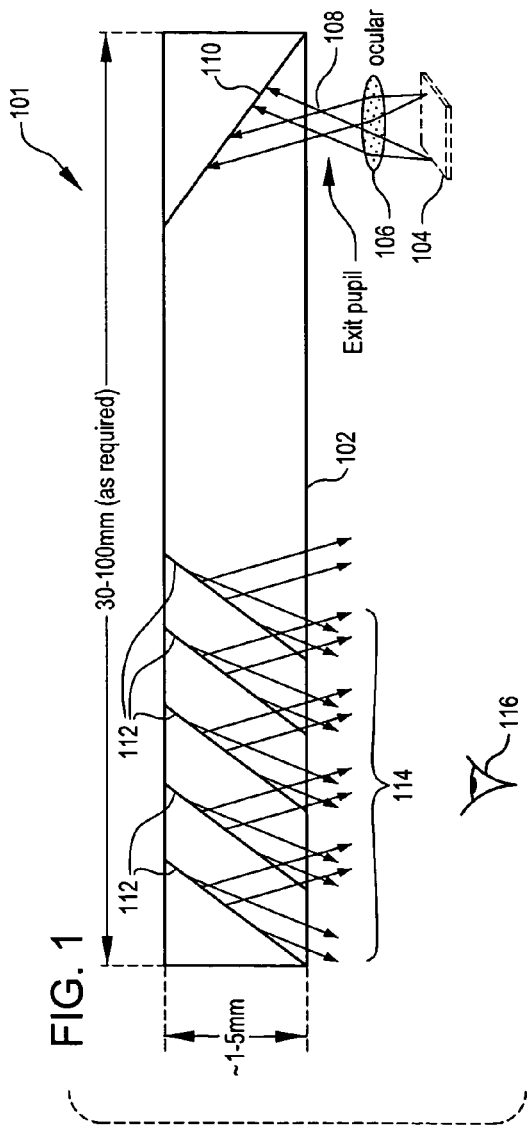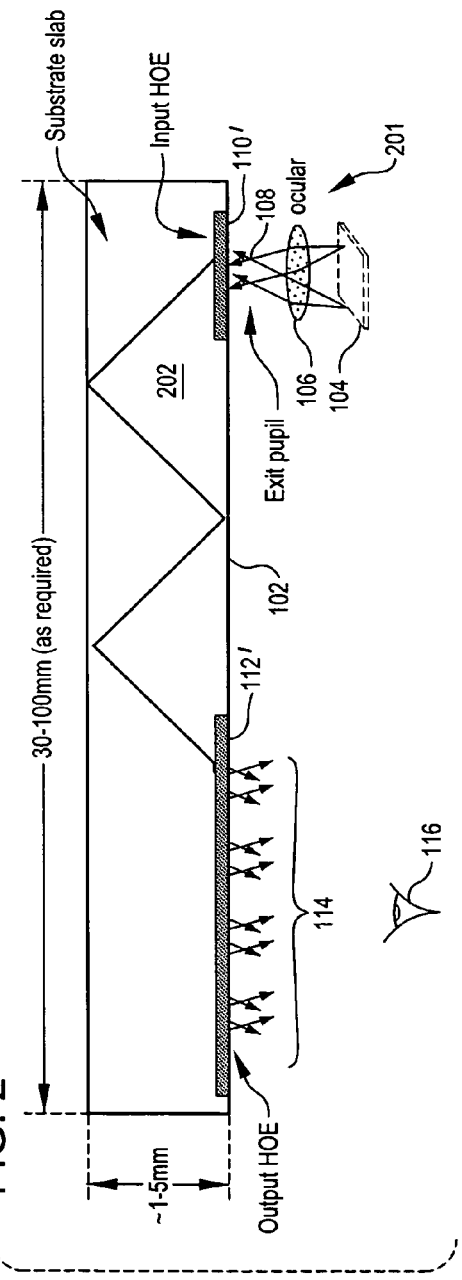

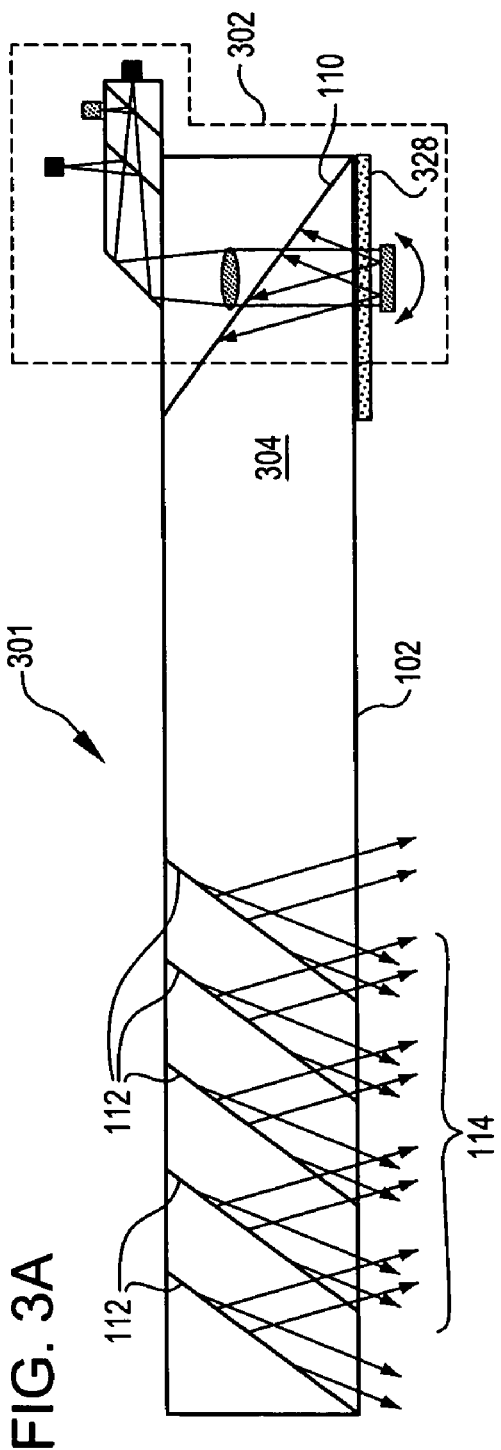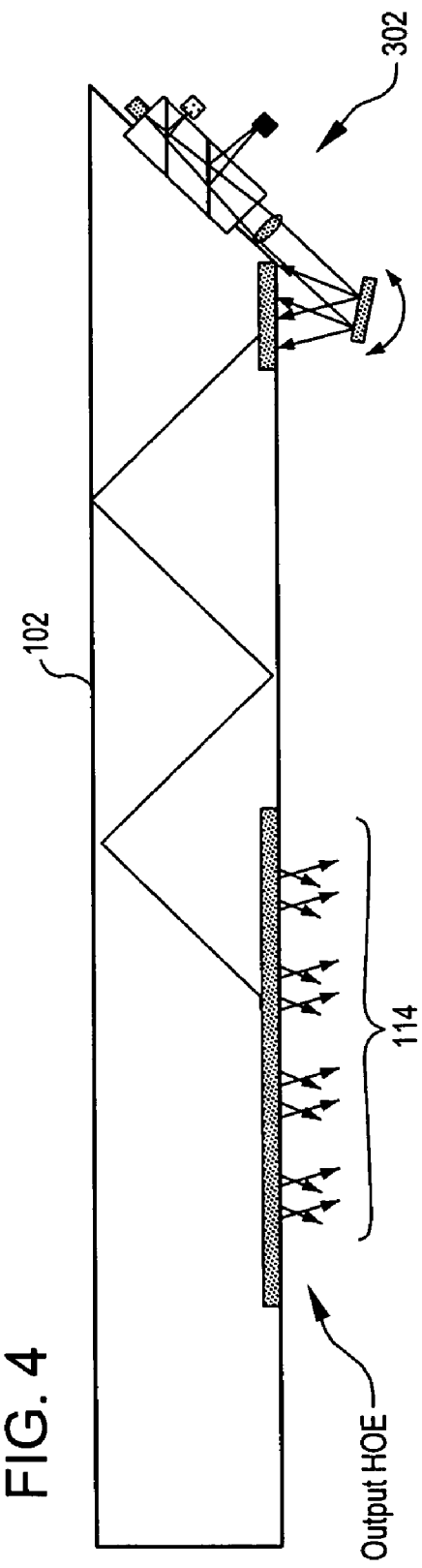

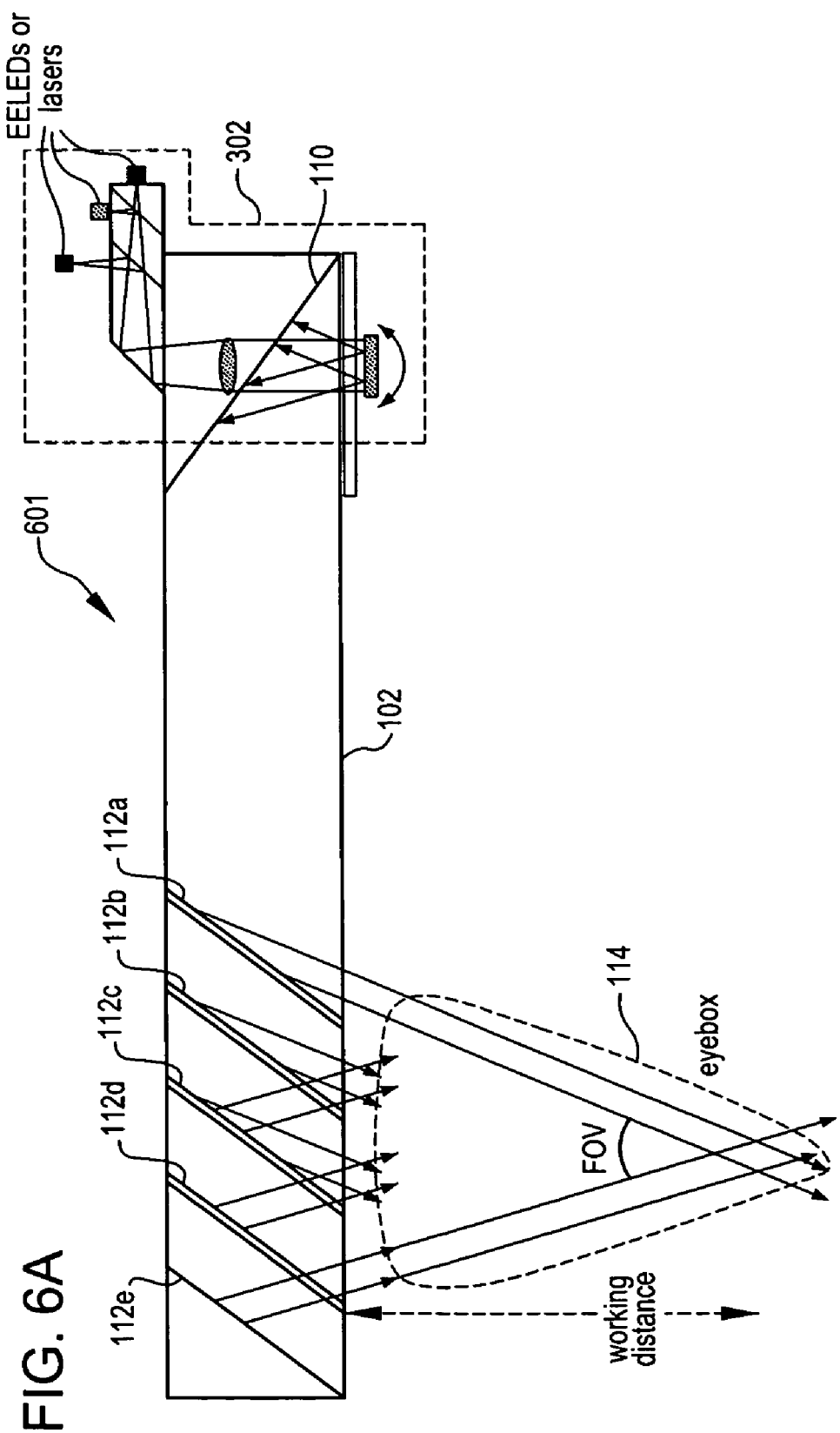

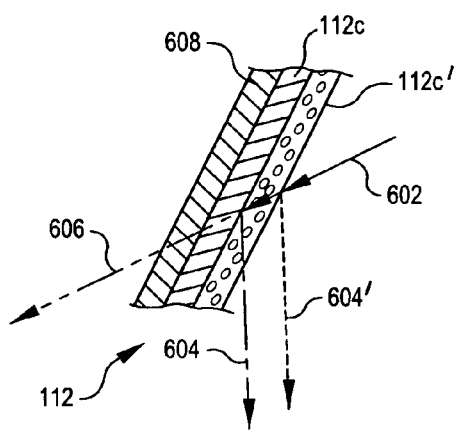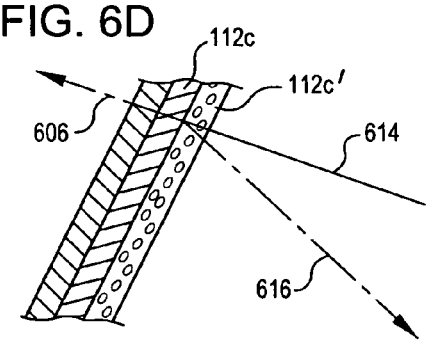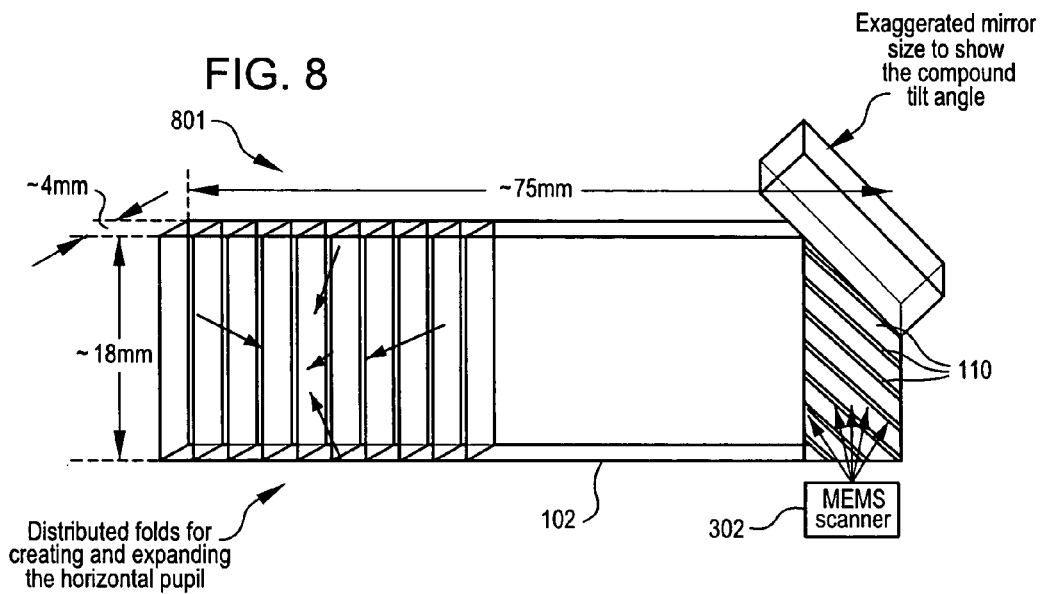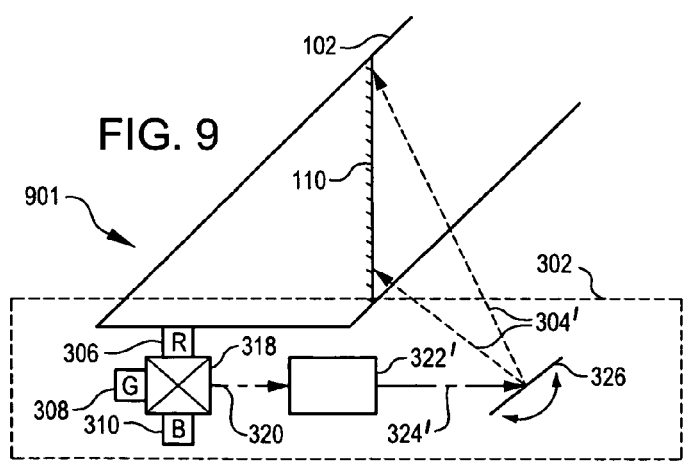

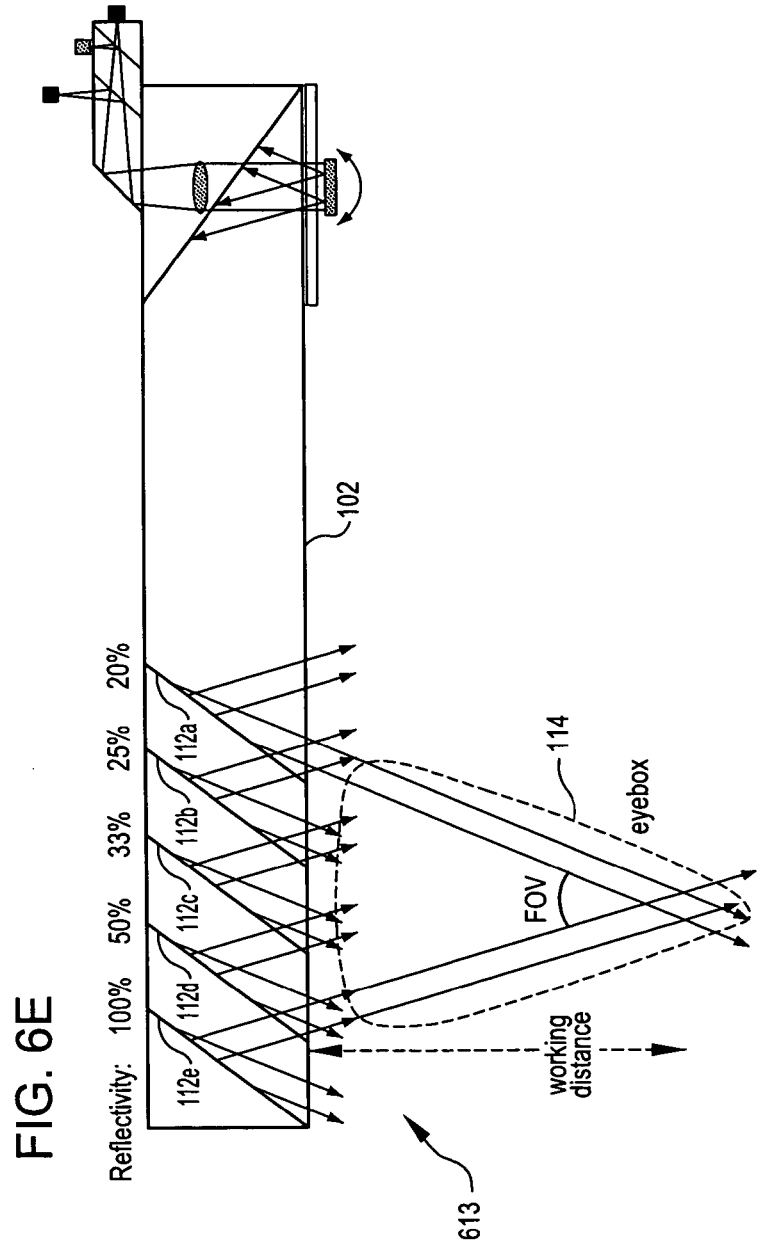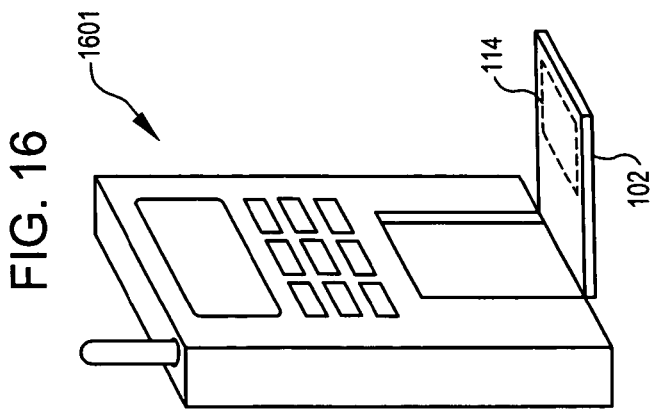

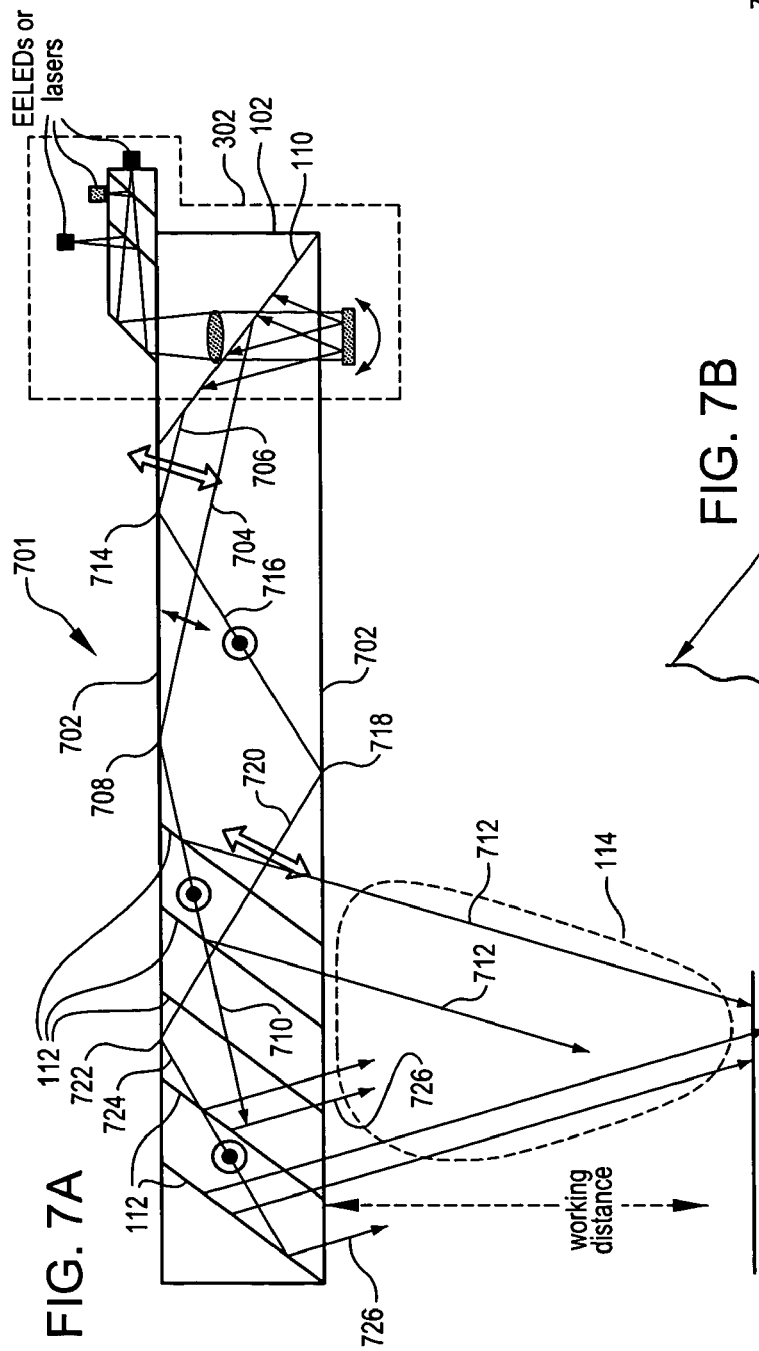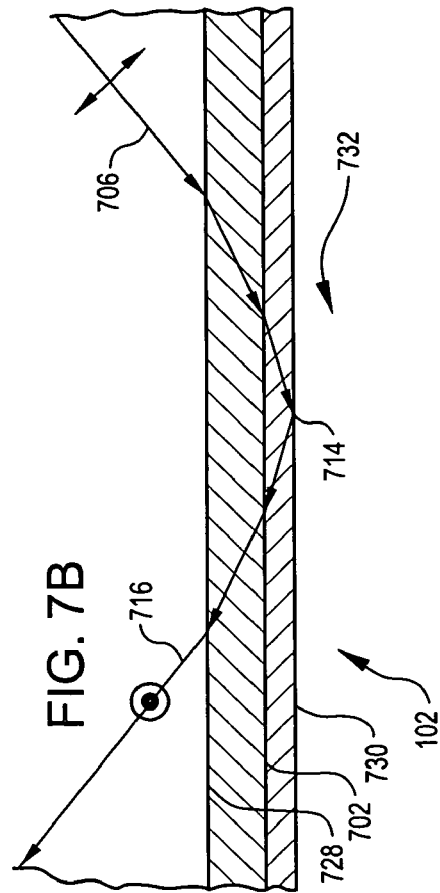

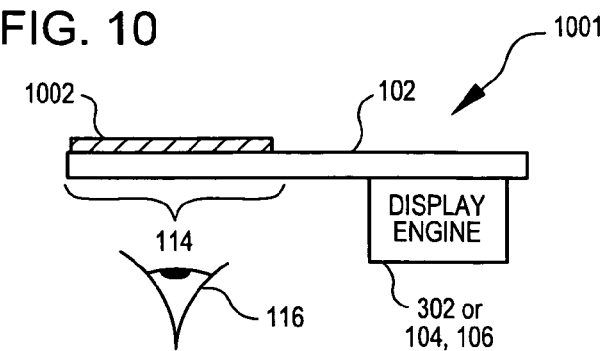
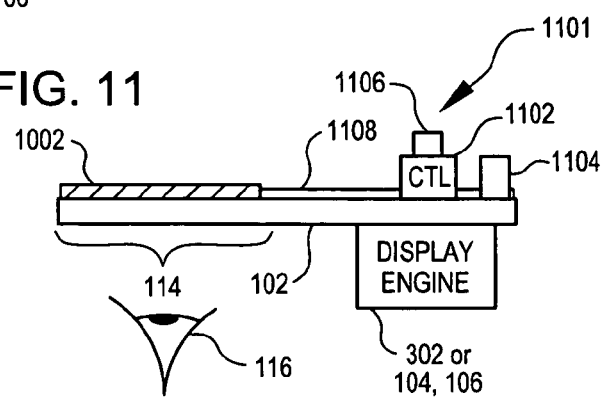
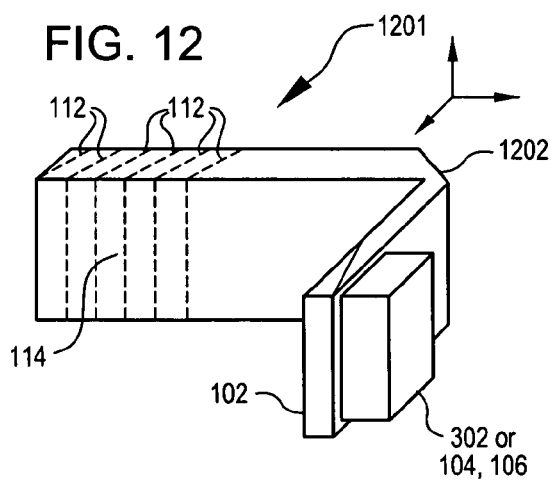
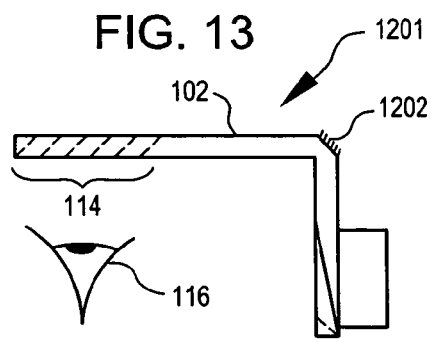
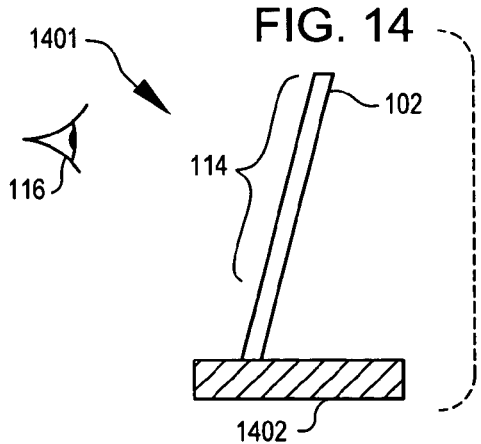

SUBSTRATE-GUIDED DISPLAY WITH IMPROVED IMAGE QUALITY

CROSS-REFERENCE TO RELATED APPLICATIONS

The present application claims priority benefit from and incorporates by reference herein U.S. Provisional Patent Application No. 60/738,484, entitled DISPLAY WITH IMAGE-GUIDING SUBSTRATE, filed Nov. 21, 2005. The present application is related to co-pending patent application Ser. No. 11/603,962, entitled DISPLAY WITH IMAGE-GUIDING SUBSTRATE, filed Nov. 21, 2006, and Ser. No. 11/603,942, entitled SUBSTRATE-GUIDED DISPLAY, filed Nov. 21, 2006.

TECHNICAL FIELD

The present disclosure relates to displays, and especially to scanned beam displays that use an image-guiding substrate optical element.

BACKGROUND

In the field of substrate-guided optical image relays, reflective or diffractive elements may cooperate with the surfaces of a relatively thin substrate to guide image rays along the substrate to produce a viewing region. This may be used for example to couple an image produced by a display source to the eye of a viewer in a near-to-eye display and/or to provide a thin form-factor such as a flat panel display.

OVERVIEW

One aspect according to an embodiment relates to apparatuses and methods for transmitting an angle-mapped input image along an image-guiding substrate to a viewing region where the image is output in a manner that maintains the angle-mapping of the image. According to various embodiments, reflective and/or diffractive (holographic) optical elements may be used, individually or mixed, in an image-guiding substrate.

According to another embodiment, an angle-mapped image generation engine may be integrated with an image-guiding substrate. The angle-mapped image generation engine may, for example, include a scanned beam display engine.

According to another embodiment, incidence angle-selective coatings may be applied to reflecting surfaces such as output reflectors in the image-guiding substrate. Such angle-selective coatings may be used, for example, to improve system efficiency by reducing or eliminating the launching of rays that fall outside a viewing region.

According to another embodiment, polarization-selective coatings and polarization modifying devices such as polarization rotators may be used to provide reflection selectivity to reflecting surfaces such as output reflectors in the image-guiding substrate. According to some embodiments, polarization rotators may comprise wave retarders or Faraday rotators. Such an approach may be used for example to improve system efficiency, broaden design constraints, improve output image quality, improve output image apparent brightness uniformity, etc.

According to another embodiment, a progression of partial reflector reflectivities may be used in input and/or output reflectors to improve output power density uniformity.

According to another embodiment, polarization-sensitivity of reflecting surfaces may be configured to sort rays that have been reflected an odd number of times from rays that have been reflected an even number of times. Such an approach may be used for example to avoid inducing symmetries in the output image caused by mixing odd- and even-numbered reflected rays.

According to another embodiment, wavelength-selective output reflectors may be used to sort input wavelengths.

According to another embodiment, compound angle input reflectors may be used in an image-guiding substrate.

According to another embodiment a scanned beam display engine may be configured to provide an adjustable or variable accommodation and/or apparent image distance to the viewing region. The scanned beam may be selected to provide a preferred beam shape expressed as an amount of convergence, parallelism, or divergence depending upon user preferences. The angle-preserving embodiment of the image-guiding substrate maintains the selected beam shape and delivers the selected shape to the image viewing region. According to another embodiment a scanned beam display engine is configured to provide a variable beam shape depending upon three-dimensional (3D) information provided in an image. Such an embodiment provides a variable-accommodation image having a 3D effect at the viewing region.

According to another aspect, an image guiding substrate may include a degree of occlusion operative to reduce at least a portion of ambient scene brightness. In some embodiments, the ambient scene may be fully occluded. In some embodiments, the brightness of an ambient scene may be attenuated. In some embodiments, the brightness of an ambient scene may be variably attenuated, for example depending upon the magnitude of ambient scene brightness, the power output of a synthetic image source, the relative importance of the ambient information and the synthetic information, etc. In some embodiments, variable attenuation may be provided by photo-chromic materials deployed on or in the image guiding substrate. In other embodiments, variable attenuation may be provided by active attenuation, such as by a controller circuit that controls a liquid crystal or electro-chromic variable attenuator based upon an ambient illumination signal from a light detector aligned to receive ambient illumination.

According to another embodiment, an image-guiding substrate may include one or more folds. The folds may be useful, for example, to form the image-guiding substrate into a preferred package size or configuration.

According to some embodiments, a display using an image-guiding substrate may be configured as a near-to-eye display. According to other embodiments, a display using an image-guiding substrate may be configured to be viewed at a distance. Such an approach may be used for example to provide a heads-up display (HUD) or a desktop or portable computer monitor.

BRIEF DESCRIPTION OF THE DRAWINGS

FIG. 1 is a schematic diagram of an image-guiding substrate display with reflective elements that uses a location-mapped display engine such as a flat panel display or a scanned intermediate image plane as an image source according to an embodiment.

FIG. 2 is a schematic diagram of an image-guiding substrate display with diffractive elements that uses a location-mapped display engine such as a flat panel display or a scanned intermediate image plane as an image source according to an embodiment.

FIG. 3A is schematic diagram of an image-guiding substrate display using reflective optics that transmits an image from an angle-mapped input image source to a viewing region according to an embodiment.

FIG. 4 is a schematic diagram of an image-guiding substrate display using diffractive optics that transmits an integrated scanned-beam display engine angle-mapped input image source to a viewing region according to an embodiment.

FIG. 6A is a schematic diagram of an image-guiding substrate display that uses polarization-selective coatings and polarization rotators on reflecting surfaces according to an embodiment.

FIG. 6C is a detail view of a layered reflector comprising a discrete angle-selective reflector and polarization-selective reflector according to an embodiment.

FIG. 6D is a detail view of the layered reflector of FIG. 6C but showing the behavior of a light beam having a non-preferred angle according to an embodiment.

FIG. 6E is a schematic diagram of an image guiding substrate display that includes variable-reflectance output mirrors according to an embodiment.

FIG. 7A is a schematic diagram of a display having an image-guiding substrate display that includes polarization rotators on substrate surfaces in combination with polarization-selective output reflectors according to an embodiment.

FIG. 7B is a detailed view of the surface of an image-guiding substrate according to an embodiment.

FIG. 8 is a perspective view of an image-guiding substrate display than includes compound-angle input reflectors according to an embodiment.

FIG. 9 is a schematic diagram of a scanned beam display engine configured to provide an adjustable or variable accommodation beam into an image-guiding substrate according to an embodiment.

FIG. 10 is a schematic diagram of an image guiding substrate display that includes an ambient occlusion member according to an embodiment.

FIG. 11 is a schematic diagram of an image-guiding substrate display that includes an actively controlled ambient occlusion member according to an embodiment.

FIG. 12 is a perspective diagram of an image-guiding substrate display that includes a fold according to an embodiment.

FIG. 13 is a top view of the image-guiding substrate display having a fold of FIG. 12 according to an embodiment.

FIG. 14 is a side view of an image-guiding substrate display configured as a desk-top or head-up display according to an embodiment.

FIG. 16 is a depiction of a portable electronic device having a display with a fold-out image-guiding substrate.

DETAILED DESCRIPTION

Figure 3B:
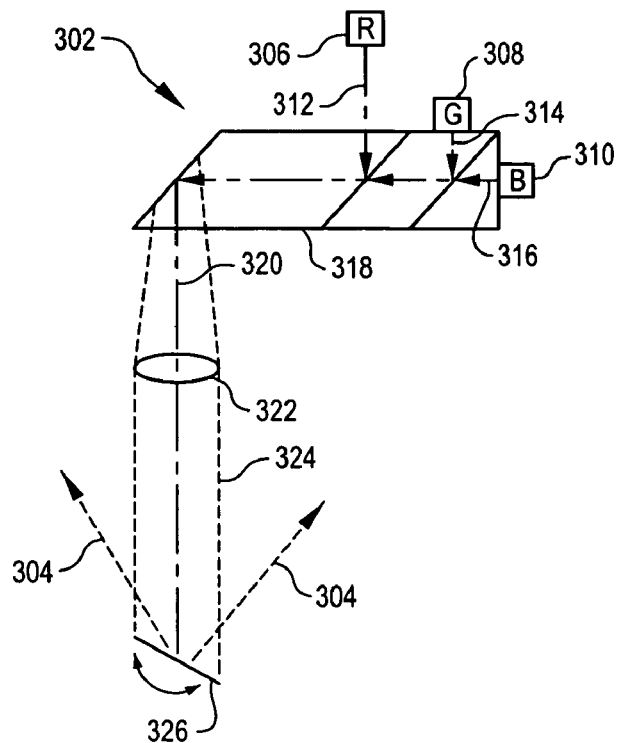
FIG. 3B is a detailed diagram of the principle optical components of a scanned beam display engine that may be used as an angle-mapped display engine according to an embodiment.

FIG. 1 is a schematic diagram of a display system 101 using an image-guiding substrate 102 with reflective elements that uses a location-mapped display engine 104 such as a flat panel display or a scanned intermediate image plane as an image source according to an embodiment. To translate the location-mapped pixels of the display into angle-mapped pixels appropriate for transmission down the substrate 102, an ocular lens 106 is used to produce a converging fan of substantially collimated rays that pass through a first pupil 108 at or near where the rays enter the image-guiding substrate 102. The angle of each of the substantially collimated rays may correspond to light coming from a particular location on the image plane of the location-mapped display engine 104. The input rays are reflected by an input reflector 110 that directs the rays generally along the axis of the image-guiding substrate 102. When rays are incident upon an edge of the substrate 102, they are reflected at an equal and opposite angle and continue down the substrate. After the rays have transited a transfer distance along the substrate, they are incident upon a series of partial reflectors 112 that direct the rays toward a viewing region 114 where they can be perceived by the eye of a viewer 116. The viewing region 114 may be defined by an exit pupil wherein substantially the entirety of the image may be perceived. The distribution of the partial reflectors 112 along the length of the substrate 102 expands the exit pupil such that the extent of the exit pupil 114 is larger than the extent of the first pupil 108. It may be noted that the distribution of the reflectors 112 may result in an exit pupil 114 that is substantially greater in dimension than the thickness of the substrate. According to some embodiments the overall length of the substrate may be approximately 30-100 millimeters and its thickness may be approximately 1-5 millimeters, although many other lengths and thicknesses are possible.

The function of the reflectors in the substrate 102 of the display 101 may alternatively be provided by diffractive (i.e. holographic) optical elements, such as those shown schematically in FIG. 2. The image-guiding substrate 102 of FIG. 2 includes an input diffractive optical element 110' and an output diffractive optical element 112' that respectively provide the functions corresponding to the input reflector 110 and the output partial reflectors 112 in the image-guiding substrate 102 of FIG. 1. The diffractive elements 110' and 112' may alternatively be referred to as holographic optical elements or simply as holographic elements. As with the display 101 of FIG. 1, the display 201 of FIG. 2 may use a location-mapped display engine such as a flat panel display or a scanned intermediate image plane as a location-mapped image source 104. The image from the image source is focused by an ocular lens (or alternatively, an ocular diffractive element or an ocular reflective element) 106 onto the input diffractive optical element 110'.

The input diffractive optical element 110' is configured to direct the input rays generally toward the viewing end of the image-guiding substrate 102, as indicated by the illustrative ray 202. The illustrative ray 202 may be successively reflected by the walls of the image guiding substrate 102 until it is incident upon the output diffractive element 112'. As may be appreciated, image rays emerging from the location-mapped display engine 104 are converted to corresponding angles by the ocular lens 106 and enter the input diffractive optical element 110' at the corresponding angles. The input diffractive optical element 110' may launch respective rays into the substrate 102 along selected paths, depending upon the corresponding input ray angle and/or location. The output diffractive optical element 112' is configured to receive the launched rays, after the rays have reflected off the walls of the substrate 102 one or more times, and couple (i.e. launch) them out into the exit pupil 114 for viewing by a viewer 116.

In contrast to the location-mapped display engines used in embodiments of FIGS. 1 and 2, an angle-mapped display engine may be used to create an image for launching down an image-guiding substrate. FIG. 3A is schematic diagram of a display embodiment 301 having an image-guiding substrate 102 that transmits an image from an angle-mapped input image source 302 to a viewing region 114. The input reflective element 110 receives angle-mapped rays 304 directly from the angle-mapped display engine 302 and directs them along the substrate 102. Because there is no ocular lens between the output of the angle-mapped display engine 302 and the input reflective element 110, there is no first pupil and because there is no location-mapped display input, there is no image plane in the system (other than in the viewer's eye). The output reflectors 112 receive the angle-mapped rays containing the image and couple it out to the viewing area 114. The exit pupil of the viewing area 114 is, according to some embodiments, the only exit pupil in the system.

According to an embodiment, the angle-mapped display engine 302 is a scanned beam display engine. FIG. 3B is a detailed diagram of the principle optical components of the scanned beam display engine 302 of FIG. 3A.

An input video signal drives a controller (not shown) that sequentially drives light sources 306, 308, and 310 to produce respective beams of light 312, 314, and 316. The light sources 306, 308, and 319 are driven to respective output powers corresponding to pixel values in the input video signal. As illustrated, light source 306 corresponds to a red light source, light source 308 corresponds to a green light source, and light source 310 corresponds to a blue light source. Thus the light source 306 is driven to an output power corresponding to the red value of a pixel while the light sources 308 and 310 are driven to respective output powers corresponding to green and blue values of the same pixel. When the next pixel is clocked in, the output powers of the light sources may be modulated corresponding to the brightness and hue of the next pixel. The respective modulated input beams 312, 314, and 316 are launched into a beam combiner 308 that combines them and produces a modulated output beam shown by its principle ray 320. The output beam 320 may be shaped by a beam shaping optical element 322 that may, for example, comprise a collimating lens. The shaped output beam 324 is incident upon a beam scanner 326. The controller (not shown) drives the beam scanner 326 (or alternatively, is driven by the beam scanner) to sequentially scan the modulated and shaped input beam 324 across a field of view as a scanned beam 304 synchronously with the modulation of the light sources 306, 308, and 310. To create an angle-mapped image, the light sources are sequentially modulated to a power proportional to the brightness of an input video image pixel. In this way, an angle-mapped image is produced in the scanned beam 304.

The light sources may include multiple emitters such as, for instance, light emitting diodes (LEDs) such as surface-emitting or edge emitting LEDs, lasers, thermal sources, arc sources, fluorescent sources, gas discharge sources, or other types of illuminators. In one embodiment, a monochrome display may be produced by using one or more red laser diodes having a wavelength of approximately 635 to 670 nanometers (nm). In the case where a single light source is used, the beam combiner 318 may be omitted.

In another embodiment, three lasers are used as light sources 306, 308, and 310; respectively a red diode laser, a green diode-pumped solid state (DPSS) laser, and a blue DPSS laser at approximately 635 nm, 532 nm, and 473 nm. While some lasers may be directly modulated, other lasers, such as DPSS lasers for example, may require external modulation such as an acousto-optic modulator (AOM) for instance. In the case where an external modulator is used, it is considered part of a light source for the present disclosure.

As illustrated, in the case of multiple emitters a beam combiner 318 may be used to combine the beams from some or all of the emitters into a single beam. The beam combiner (when used) may be of a number of types such as an "x-cube" in addition to the "slab combiner" shown. The operation of the slab beam combiner 318 may be more fully appreciated by reference to U.S. patent application Ser. No. 10/828,876, entitled APPARATUS AND METHOD FOR COMBINING MULTIPLE ELECTROMAGNETIC BEAMS INTO A COMPOSITE BEAM, invented by Watson et al., filed Apr. 20, 2004, and hereby incorporated by reference.

The beam-shaping optical element 322 may, for example, include one or more collimating lenses and/or apertures. Additionally, while the wavelengths described in the previous embodiments have been in the optically visible range, other wavelengths may be within the scope of the invention. Light beam 324, while illustrated as a single beam, may comprise a plurality of beams incident on a single scanner 326 or onto separate scanners.

Scanner 326 may be formed using many known technologies such as, for instance, a rotating mirrored polygon, a mirror on a voice-coil as is used in miniature bar code scanners such as used in the Symbol Technologies SE 900 scan engine, a mirror affixed to a high speed motor or a mirror on a bimorph beam as described in U.S. Pat. No. 4,387,297 entitled PORTABLE LASER SCANNING SYSTEM AND SCANNING METHODS, an in-line or "axial" gyrating, or "axial" scan element such as is described by U.S. Pat. No. 6,390,370 entitled LIGHT BEAM SCANNING PEN, SCAN MODULE FOR THE DEVICE AND METHOD OF UTILIZATION, a non-powered scanning assembly such as is described in U.S. patent application Ser. No. 10/007,784, SCANNER AND METHOD FOR SWEEPING A BEAM ACROSS A TARGET, commonly assigned herewith, a MEMS scanner, or other type. All of the patents and applications referenced in this paragraph are hereby incorporated by reference A MEMS scanner may be of a type described in U.S. Pat. No. 6,140,979, entitled SCANNED DISPLAY WITH PINCH, TIMING, AND DISTORTION CORRECTION; U.S. Pat. No. 6,245,590, entitled FREQUENCY TUNABLE RESONANT SCANNER AND METHOD OF MAKING; U.S. Pat. No. 6,285,489, entitled FREQUENCY TUNABLE RESONANT SCANNER WITH AUXILIARY ARMS; U.S. Pat. No. 6,331,909, entitled FREQUENCY TUNABLE RESONANT SCANNER; U.S. Pat. No. 6,362,912, entitled SCANNED IMAGING APPARATUS WITH SWITCHED FEEDS; U.S. Pat. No. 6,384,406, entitled ACTIVE TUNING OF A TORSIONAL RESONANT STRUCTURE; U.S. Pat. No. 6,433,907, entitled SCANNED DISPLAY WITH PLURALITY OF SCANNING ASSEMBLIES; U.S. Pat. No. 6,512,622, entitled ACTIVE TUNING OF A TORSIONAL RESONANT STRUCTURE; U.S. Pat. No. 6,515,278, entitled FREQUENCY TUNABLE RESONANT SCANNER AND METHOD OF MAKING; U.S. Pat. No. 6,515,781, entitled SCANNED IMAGING APPARATUS WITH SWITCHED FEEDS; U.S. Pat. No. 6,525,310, entitled FREQUENCY TUNABLE RESONANT SCANNER; and/or U.S. patent application Ser. No. 10/984327, entitled MEMS DEVICE HAVING SIMPLIFIED DRIVE; for example; all incorporated by reference herein.

In the case of a 1D scanner, the scanner is driven to scan output beam 304 along a single axis and a second scanner is driven to scan the output beam in a second axis. In such a system, both scanners are referred to as scanner 326. In the case of a 2D scanner, scanner 326 is driven to scan output beam 304 along a plurality of axes so as to sequentially illuminate angle mapped pixels in two dimensions.

In some display systems 301, a MEMS scanner may be preferred, owing to the high frequency, durability, repeatability, and/or energy efficiency of such devices. A bulk micro-machined or surface micro-machined silicon MEMS scanner may be preferred for some applications depending upon the particular performance, environment or configuration. Other embodiments may be preferred for other applications.

A 2D MEMS scanner 326 scans one or more light beams at high speed in a pattern of angles that corresponds to an entire image or a selected region of an image within a frame period. A typical frame rate may be 60 Hz, for example. Often, it is advantageous to run one or both scan axes resonantly. In one embodiment, one axis is run resonantly at about 19 KHz while the other axis is run non-resonantly in a sawtooth pattern to create a progressive scan pattern. A progressively scanned bi-directional approach with a single beam, scanning horizontally at scan frequency of approximately 19 KHz and scanning vertically in sawtooth pattern at 60 Hz can approximate an SVGA resolution. In one such system, the horizontal scan motion is driven electrostatically and the vertical scan motion is driven magnetically. Alternatively, both the horizontal scan may be driven magnetically or capacitively. Electrostatic driving may include electrostatic plates, comb drives or similar approaches. In various embodiments, both axes may be driven sinusoidally or resonantly.

The display 301 may be embodied as monochrome, as full-color, or hyper-spectral. In some embodiments, it may also be desirable to add color channels between the conventional RGB channels used for many color displays. Herein, the term grayscale and related discussion shall be understood to refer to each of these embodiments as well as other methods or applications within the scope of the invention. In the control apparatus and methods described below, pixel gray levels may comprise a single value in the case of a monochrome system, or may comprise an RGB triad or greater in the case of color or hyperspectral systems. Control may be applied individually to the output power of particular channels (for instance red, green, and blue channels) or may be applied universally to all channels, for instance as luminance modulation.

Returning to FIG. 3A, there is illustrated a method of improving the optical efficiency of the display 301. The input reflector 110 may, for example be a polarization-selective reflector. In this case, only the polarization content of the input beam 324 corresponding to the transmitted polarity of the input reflector passes through. A polarization rotator 328, e.g., such as a quarter-wave plate, may circularly polarize the input beam prior to the beam impinging upon the beam scanner 326. The scanned beam 304 passes back through the polarization rotator 328, again rotating the polarization in the same direction, resulting in a scanned beam 304 that has a linear polarization 90 degrees from that of the input beam 324. A polarization 90 degrees from that of the polarization of the input beam 324 corresponds to the reflecting polarization of the polarization-selective reflector 110. This may result in a relatively larger portion up to substantially all of the power of the scanned beam being launched along the axis of the image-guiding substrate 102.

To the extent that rotation in a quarter-wave plate is wavelength-sensitive, somewhat less than all of the scanned beam power may be directed down the image guiding substrate 102 by the polarization-selective input reflector 110, depending upon wavelength. Where, for example, green light is reflected at near 100% efficiency, red light and blue light may appear somewhat dimmer when viewed by the viewer, if no accommodation is made. In such cases, it may be advantageous to increase the relative power of the red and blue light sources to properly white-balance the image delivered to the viewer.

It may be noted that the configuration apparently shown in FIG. 3A may result in half of the illumination beam power being lost in the first pass through the polarization-selective reflector 110. However, according to some embodiments, this is no more loss than if the input reflector 110 is configured as a 50% reflector, and the subsequent 50% loss of power in the scanned beam is improved upon. To improve efficiency further, the input beam may be plane-polarized prior to its first pass through the input reflector 110. This may be done for example using a recycled polarization apparatus such as a reflective polarizer combined with polarization rotators. Alternatively or additionally, the natural elliptical polarization of many light sources, especially laser diodes, may be used to advantage by aligning the major axis of polarization with the transmission polarization of the polarization-selective reflector 110.

It may be noted that in the embodiment of FIGS. 3A and 3B, the scanned beam display engine 302 may be integrated with the image guiding substrate 102, such as with the latter providing structural support and alignment.

FIG. 4 is a schematic diagram of an image-guiding substrate using diffractive optics that transmits an image produced by an integrated scanned-beam display engine 302 to a viewing region 114. The scanned beam display engine 302 as illustrated in FIG. 4 is an alternative embodiment to the scanned beam display engine 302 of FIGS. 3A and 3B. The components operate similarly to the manner described above. In the embodiment of FIG. 4, the display engine 302 produces an angle-mapped image. According to an embodiment, the composite modulated beam 324 output from the beam combiner 318 is launched onto the scanner 326 at a 36 degree angle, the MEMS scanner is positioned with its center aligned with the corner of the image guiding substrate where a first input mirror intersects with the corner, and the MEMS scanner is positioned with its reflective surface 4 millimeters from the entrance face of the image-guiding substrate.

Figure 5:
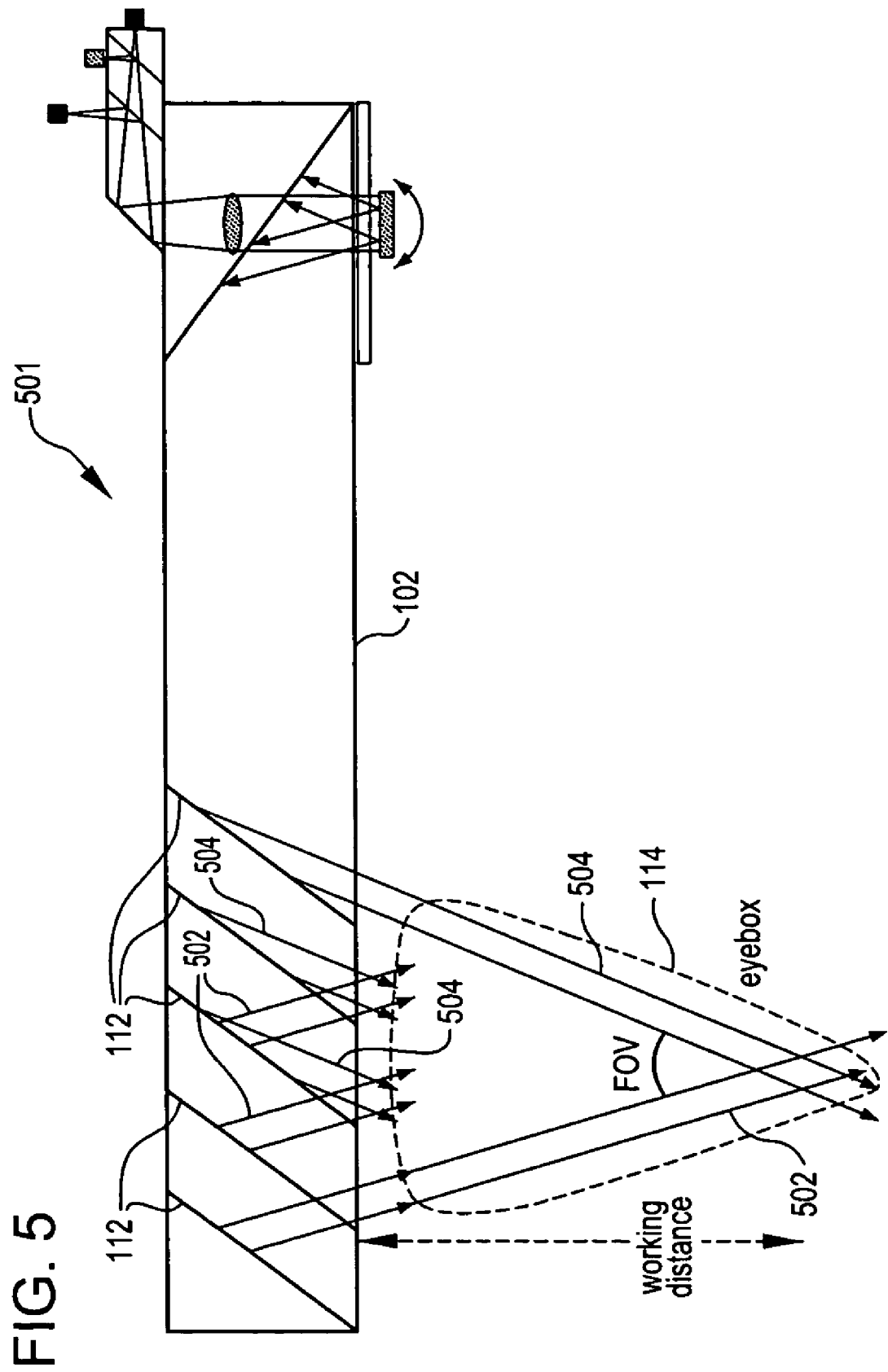
FIG. 5 is a schematic diagram of an image-guiding substrate display using incidence angle-selective coatings applied to reflecting surfaces in the image-guiding substrate according to an embodiment.

FIG. 5 is a schematic diagram of display 501 including an image-guiding substrate 102 that includes incidence angle-selective coatings applied to reflecting surfaces 112 according to an embodiment. The partially reflective coatings on reflectors 112 are selected to favor reflecting light arriving at angles that will contribute power to the viewing region 114. As may be seen, the viewing region or "eyebox" 114 of FIG. 5 is shown as having a depth, the depth being depicted on the vertical axis of the figure. While the depth extent of the eyebox is first shown in FIG. 5, such a viewing volume similarly exists in other embodiments, but has been omitted for clarity. The term viewing region may refer to the volumetric eyebox as well as to simplifications thereof.

As may be seen, a certain range of rays reflected by any one reflector 112 (or alternatively by a diffractive element 112') may contribute to a full image within the viewing region. By comparing the embodiment of FIG. 5 to the embodiment of FIG. 3A, it may be seen that leftward directed rays emerging from the left side of the viewing region do not contribute to the image because, while they depict the right side of the image, there are no superimposed rightward directed rays to depict the left side of the image. Similarly, looking at the right side of the viewing region in FIG. 3A, one can see rightward directed rays that carry information corresponding to the left side of the displayed image. Such rightward directed rays are similarly of limited value because there are no superimposed leftward directed rays to carry information related to the right side of the displayed image.

The embodiment of FIG. 5 may improve system efficiency by concentrating reflected energy in locations of the viewing region 114 where they are of the most use and most likely to reach the viewer's eye 116. In particular, the rightward directed rays 502, which carry information related to the left side of the image, are produced primarily in the left and central portions of the viewing region 114. Leftward directed rays 504, which carry information related to the right side of the image, are produced primarily in the right and central portions of the viewing region 114. The preferred viewing region 114 thus contains information related the full extent of the image and regions that do not contain information related to substantially the full extent of the image substantially do not receive light energy because such light energy would not typically reach the viewer's eye 116 and would be wasted.

Angle-selective partially reflecting coatings, which are known to the art, are selectively applied to the reflectors 112 to create the selective production of rays. Angle-mapping produced by the angle-mapped display engine 302, or alternatively by the ocular lens of a location-mapped display engine, defines pixel locations by the angles of the rays transmitted along the image-guiding substrate 102. Thus, at any given point along the image-guiding substrate 102 each column of pixels in the image is represented by a column of rays at a common angle. Depending upon whether the column of rays has undergone an even number or an odd number of reflections from the walls of the image-guiding substrate 102, the rays corresponding to a given column will generally be at one of two angles, either downward directed, having just reflected off the top surface or upward directed, having just reflected off the bottom surface of the image-guiding substrate. While only two angles are depicted in the figures, it will be understood that a near-continuum of angles of rays may be present in an entire image as the rays are propagated down the image-guiding substrate 102. The particular reflection angles selected for partial reflection by each individual reflector 112 of course depends upon geometric considerations including the number of wall reflections given rays undergo while transiting the length of the image-guiding substrate 102. It may be noted that in one embodiment, rays not contributing to the viewing region 114 are not discarded, but rather are selectively reflected. Thus, light source power may be concentrated where it is most useful.

It will be understood that while the foregoing description refers to a reflector-based embodiment of the image-guiding substrate 102, angle-selective properties may similarly be implemented in a diffractive element-based embodiment.

Figure 6B:
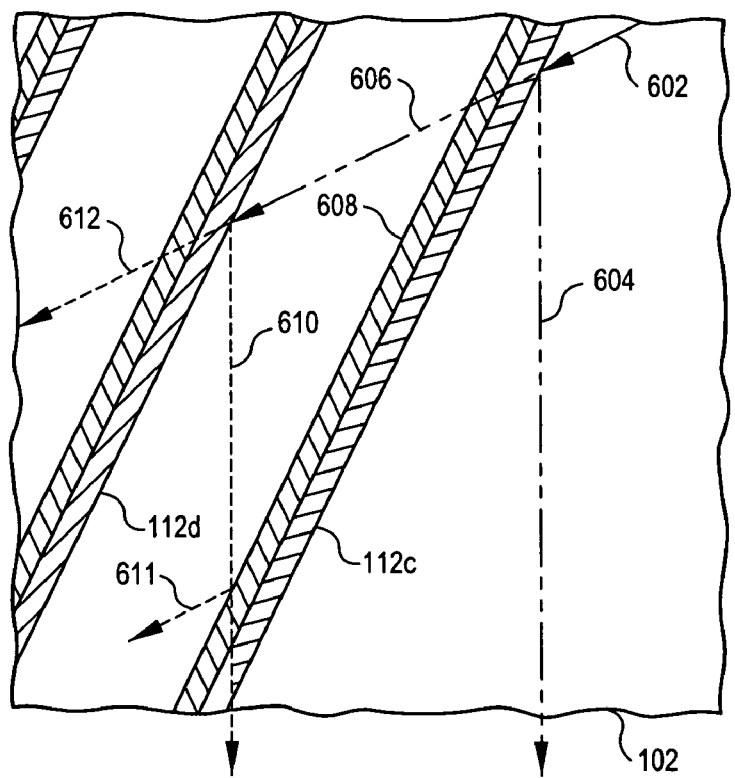
FIG. 6B is a detail view of the viewing region reflectors of FIG. 6A according to an embodiment.

FIG. 6A is a schematic diagram of display embodiment 601 having an image-guiding substrate 102 that uses polarization-selective coatings and polarization control layers, such as for example wave retarders, Faraday rotators, or half-wave plates, on at least some of the reflecting surfaces 112. FIG. 6B is a detail view of some reflecting surfaces 112 showing a layered structure according to an embodiment.

In display 601, the display engine 302, optionally in cooperation with a polarization selective input reflector 110 or input diffraction element 110', is configured to launch rays having selected polarization into the image-guiding substrate 102. The selected polarization may comprise linear, elliptical, or circular polarization Referring to FIG. 6B, a ray 602 having a first polarization is received and partially reflected as launched ray 604 by reflector 112C, reflector 112C being configured to at least partially reflect light having a selected polarization component present in received ray 602. A non-reflected portion of received ray 602 is transmitted through the reflector 112c as ray 606. As ray 606 passes through the polarization altering element or polarization control layer 608, which may for example be a half-wave plate, Faraday rotator, or arbitrary wave retarder; the ray's polarization state is changed. According to an embodiment, the polarization state of ray 606 is changed by the polarization control layer 608 by an amount selected to at least partially reflect a desired portion of light from the subsequent reflector 112d. Ray 606 then is incident upon reflector 112d which, in turn, launches a reflected ray 610 directed out the face of the image-guiding substrate 102, and transmits a non-reflected portion 612.

According to some embodiments, the combination of reflectors 112 and polarization control layers 608 may be used to selectively distribute launched power across the output region of the image-guiding substrate. This approach will be discussed more completely in conjunction with description of FIG. 6E below, it being understood that selection of the polarization state of incoming ray 602, the polarization selectivity of the reflectors 112 and the polarization rotation of the polarization control layers 608 may provide for a selected percentage of reflection and launch by each of the plurality of output mirrors 112. Such an approach may be useful for distributing the power corresponding to a given image ray over a selected subset of the output region of the image guiding substrate.

According to some embodiments, the combination of polarization-selective reflectors 112 and polarization control layers 608 may be used to prevent multiple reflections of launched rays off the output reflectors. In contrast, for other embodiments using closely packed reflectors 112, a launched ray 610 that is launched at an angle where it intersects another reflector may reflect off the back of the neighboring reflector and cause aberration, as indicated by ray 611. Such an aberration may for example result in decreased power density in stripes corresponding to the output mirror overlap locations. In an exemplary embodiment, however, the polarization control layers 608 and polarization selective reflectors 112 may be configured to allow passage through a reflector 112c of rays that have twice passed through the polarization control layer 608. Alternatively, the layers may be arranged to absorb twice reflected rays. In either case, the ray is substantially not double reflected to cause an aberration, such as a power density aberration, chromatic aberration, and/or interference effects.

As indicated in FIG. 6A, the reflective coatings 112 may also be configured to preferentially reflect rays at a particular range of angles. This may be produced by monolithic reflection layers that include both polarization preference and angle preference, or alternatively separate angle preferential and polarization preferential partial reflective layers may be used, each layer contributing a portion of the reflected energy. FIG. 6C illustrates a layered reflector comprising a separate angle-selective reflector 112c' and polarization-selective reflector 112c along with a polarization rotator 608. According to some embodiments, the polarization- and angle-selective reflective properties may be combined in single layers. For a two-layer system, a received beam 602 having both a first polarization and a first angle is received by a reflector 112. A first angle-selective reflector 112c' partially reflects the received beam 602 as launched beam 604' because the angle of incoming beam 602 corresponds to the angle preference of the reflector 112c'. Energy not reflected passes through reflector 112c' and is incident upon the polarization-selective reflector 112c. The polarization-selective reflector 112c reflects a portion of the energy as launched beam 604 because the polarization of the received beam 602 (the portion not already reflected by the angle-selective reflector 112c') corresponds to the preferred polarization of reflector 112c. A non-reflected portion continues through reflector 112c, is rotated by the polarization rotator 608 and continues as transmitted beam 606. Although launched beams 604 and 604' are not necessarily superimposed, but rather side-by-side, they convey corresponding image information because they are parallel. Depending upon the spacing of rays 604 and 604', they may enter a viewer's pupil simultaneously at a common angle to provide light energy corresponding to a single pixel. As a user's eye moves relative to the eyebox, ray 604' may fall outside the viewer's pupil but be replaced by another corresponding ray 604" at a common angle to maintain pixel brightness.

FIG. 6D depicts an embodiment where a beam 604 is received at an angle that is not preferred by the angle-selective reflector 112c' but where the beam 604 has a polarization that is preferred by the polarization-selective reflector 112c. As may be seen, beam 614 passes through angle-selective reflective layer 112c' but is partially reflected by the polarization-selective reflective layer 112c to produce launched beam 616. Transmitted beam 606 thus contains additional energy compared to the case of FIG. 6C because it was not partially reflected twice. Similarly, launched beam 616 contains less energy than the sum of launched beams 604 and 604' of FIG. 6C. Thus, reflectors with combined polarization sensitivity and angle sensitivity may be used.

As will be apparent, the order and the nature of the layers 608, 112, and 112' may be changed while remaining within the scope of the claims.

According do another embodiment, plural wavelengths per color channel may be generated by additional light emitters. According to some embodiments, the output reflectors 112 (and/or output diffractive element 112') may be configured to be wavelength-selective. For example, two red-channel sources may include a red laser diode at 635 nanometers wavelength and a red laser diode at 650 nanometers wavelength. Alternate mirrors 112 may selectively reflect the two wavelengths. That is the first, third, fifth, etc. mirrors may be configured to reflect 635 nanometer light but pass 650 nanometer light, and the second, fourth, sixth, etc. mirrors may be configured to reflect 650 nanometer light and pass 635 nanometer light. A ray of 635 nanometer light reflected by the third mirror would thus pass through the second mirror without being reflected a second time. Mirrors may thus be closely packed without rays being double-reflected by neighboring output mirrors 112. The relative intensities of the plural wavelengths per channel may be adjusted for white point or color balance differences to maintain common pixel hue and brightness.

FIG. 6E illustrates an embodiment 613 wherein output mirrors in the image-guiding substrate 102 are configured to have monotonically increasing reflectivity to distribute output power substantially evenly across the viewing region 114. The graded reflectivity of the output mirrors 112a, 112b, 112c, 112d, and 112e helps to achieve improved uniformity in output intensity of beams launched into the viewing region 114. As indicated, in one embodiment the reflectivity is varied as 20%, 25%, 33%, 50%, and 100% (0.20, 0.25, 0.33, 0.50, and 1.00), respectively, for mirrors 112a-112e. The reflective coatings used on the output mirrors 112 may be characterized as broadband partially reflective, according to an embodiment. Such coatings are widely available.

Of course different numbers of output reflectors may be used. For example, a 21-output mirror display may use nominal partial reflectivities of 4.7% (for the first mirror), 5%, 5.3%, 5.6%, 5.9%, 6.3%, 6.7%, 7.1%, 7.7%, 8.3%, 9.1%, 10%, 11.1%, 12.5%, 14.3%, 16.7%, 20%, 25%, 33%, 50%, and 100% (for the last mirror), respectively. These reflectivities correspond to the series 1/21, 1/20, 1/19, . . . , 1/3, 1/2, 1. A generalized approach for determining nominal partial reflectivity of an output reflector may be Reflectivity=(1/Y) *[1/(X+1)], wherein X is the number of mirrors remaining to be traversed by a portion of a ray not launched by the mirror and 1/Y is an occlusion (described below). For a fully occluded display (no background image seen through the output structure) the first term simplifies to unity.

Generally speaking, a reflectivity tolerance of ±1% is relatively easily achievable in partial broadband reflectors. Improved tolerance may be achieved by improving inspection, process control, process equipment design, etc. Some variation off the nominal reflectivities may be permissible depending upon application and sensitivity of human vision. According to one embodiment, batches of reflector slabs may be sorted after application of the reflective coatings to achieve more smoothly varying reflectivities. For example, a reflectivity that is a little less than nominal may be grouped with like other reflectivities a little less than nominal and a reflectivity a little higher than nominal may be similarly grouped with other reflectivities a little higher than nominal. Such a procedure may help to reduce the incidence of a reflector at a high end of tolerance from being placed adjacent a reflector at a low end of tolerance, thus helping to reduce the degree to which artifacts are visible.

According to an embodiment, a polarization-selective reflector and polarization control element may be combined with a partial broadband reflector. For example, the partial broadband reflector may be selected to reflect at a somewhat lower than desired reflectivity. A polarization-selective reflector may augment the partial broadband reflector to bring the overall reflectivity (and hence the percentage of launched ray power) up to the desired value for the combined element. For example, an amount of polarization rotation from the preceding mirror or mirror combination may be selected by the polarization control element. Depending on the relative polarization state of the incoming beam, the polarization control element, and the polarization-selective reflector, a selected additional amount of reflectivity may be realized to "tune" the combined broadband partial reflector and polarization-selective reflector to launch a desired percentage of beam energy into the viewing region. For embodiments using plane polarization, for example, a wave-plate may be rotated relative to the incoming beam polarization to achieve a desired output beam rotation, and thus determine the amount of augmentation reflectivity of the polarization-selective reflector as a function of its polarization angle.

According to some embodiments, higher reflectance partial reflectors may be formed using one process, such as a partial broadband reflector, and lower reflectance partial reflectors may be formed using another process, such as selected polarization rotation or partial broadband augmented by selected polarization rotation. A cost balance may be used to inform the choice of what approach to use for a given output reflector.

The progression of reflectivities illustrated in FIG. 6E and described above may be especially appropriate for an occluded display, where the desire is for the user to see only the displayed image. In some applications, it may be desirable to construct a see-through display using the approach of FIG. 6E. For example, for a 50% see-through display, the values of the reflectivities shown in FIG. 6E or described above may be divided by two. For a 75% see-through display, the values may be divided by four.

Input reflectors may be similarly configured with a progression of reflectivities to help in maintaining uniform brightness.

As an alternative to (or in combination with) providing broadband reflectors at a progression of reflectivities, polarization-based reflectors 112 may be used in combination with polarization control layers 608 as shown in FIG. 6B to achieve a progression of reflectivity as illustrated in FIG. 6E. The percentage of light reflected by each output mirror 112 may thus be controlled by selecting the polarization to which incident light is transformed (relative to the polarization selectivity of the mirror) prior to impinging on a particular polarization-selective mirror 112.

Additionally, angle-sensitive reflectors having a progression of reflectivities or angle-sensitive reflectors in combination with progressive reflectors may be used, for example to improve system efficiency.

According to an embodiment, layers between output reflectors, polarization control elements, etc. may be formed from one or more non-linear optical materials in one or more layers, such as a material actuatable to modulate index of refraction. According to an approach, the material layers may be energized to change the apparent angle of the reflectors relative to the mean ray delivery axis. The index modulation layers may be formed from electro-optic materials, thermo-optic materials; liquid crystal materials, structures including combinations, etc. A controller may provide a drive signal arbitrarily. For example, periodic changes in index may be used to create a periodic scanning effect. According to another example, the indices may be (directly or indirectly) controlled by a user or program, for example to make the image pan, zoom, change (reflectivity of the output reflectors such as to provide) variable occlusion, reveal hidden indicia or image portions, change the backscattered image, etc. Drive inputs may be combined to produce composite effects.

FIG. 7A is a schematic diagram of a display 701 having an image-guiding substrate 102 that uses polarization rotators 702 on the surfaces of the substrate and polarization-selective reflectors 112. One effect of the embodiment 701 is to sort odd-bounce rays from even-bounce rays, thus providing preferred launching of rays into the viewing region 114. One effect of the embodiment of FIG. 7 is to increase system efficiency as described above in conjunction with FIG. 5. The approach may also be used to improve design freedom and allow more geometric choices for the image-guiding substrate 102.

The display engine 302, here depicted as an angle-mapped scanned beam display engine, optionally in combination with input reflector 110 or diffractive element 110', launches polarized rays into the image-guiding substrate 102. The angle-mapping of the image rays provides a launched ray 704 corresponding to the right portion of the displayed image at a first angle and a launched ray 706 corresponding to the left portion of the displayed image at a second angle, as shown. Of course there may be many additional angles of rays corresponding to different regions of the displayed image, but two launched angles are shown for clarity. As indicated, the launched rays 704 and 706 share a common first polarization indicated by the double-ended arrows. The launched ray 704 is launched at a relatively shallow angle and reflects off the wall of the image-guiding substrate 102 at the point 708. The walls of the image-guiding substrate 102 include a polarization rotator such as an achromatic quarter-wave retarder (that acts as a half-wave retarder providing a 90 degree polarization rotation with a double pass). The polarization rotator rotates the polarization of the received ray 704 and produces a reflected ray 710 having a rotated polarization, such as a 90 degree rotation as indicated by the concentric circles. The output reflectors 112 are configured to preferentially partially reflect rays having a polarization corresponding to the ray 710. Thus, the output reflectors 112 partially reflect the ray 710 into the viewing region 114 as output rays 712. Ray 710 continues through the series of reflectors 112, being partially reflected at each reflector. Eventually, its power drops substantially and little power is launched into areas not corresponding to the viewing region 114.

Returning to launched ray 706, corresponding to the left portion of the displayed image, it is launched at a somewhat more acute angle than ray 704 and is reflected at a point 714 to produce a reflected ray 716 having a rotated polarization. Reflected ray 716 propagates down the image-guiding substrate 102 until it is reflected at a point 718 to produce a twice-reflected ray 720, again having a rotated polarization, for example corresponding to the polarization of ray 706. Because twice-reflected ray 720 has a polarization that is not preferentially reflected by the polarization-selective partial reflectors 112, it passes through the first few reflectors, substantially unaffected. Twice reflected ray 720 is then reflected by the wall of the image-guiding substrate 102 at a point 722, where its polarization is again rotated to produce thrice reflected ray 724. Thrice reflected ray 724 has a polarization that corresponds to the preferred polarization of the partially reflective polarization-selective reflectors 112. Thus at each reflector 112, thrice reflected ray 724 is partially reflected as launched ray 726 into the viewing region 114.

It may be noted that since twice reflected ray 720 was substantially not reflected by reflectors 112, energy corresponding to the left side of the displayed image was not launched into a region to the right of the viewing region 114 where it would have been wasted. Instead, the energy corresponding to the left side of the image remained inside the image-guiding substrate 102 until it reached the central or left portion of the viewing region 114. Similarly, once reflected ray 710 corresponding to the right portion of the image was reflected preferentially in the right and central portions of the viewing region 114 to produce usable energy corresponding to the right portion of the displayed image in the viewing region.

While the example shown provides for launching of energy into the viewing region from rays that had been reflected from the walls 702 an odd number of times, it is similarly possible and may be preferable to launch rays that had been reflected an even number of times, depending upon the geometry of the image-guiding substrate 102 and/or other considerations.

FIG. 7B is a detailed view of a polarization-rotating wall of an image-guiding substrate 102 showing the polarization rotation of an illustrative ray. According to the example, incoming ray 706 has a vertical polarization as it travels through the bulk material 728 of the image guiding substrate 102, as indicated by the double-arrow. The bulk material 728 may for example be polycarbonate or other suitable material transparent to the wavelength of the transmitted rays. The incoming ray 706 enters a polarization rotating layer 702, possibly being refracted somewhat as indicated according to the indices of refraction of the bulk material 728 and the rotating layer. In the example, the ray passes through the polarization rotating layer 702 having been rotated, for example to be come a circularly-rotated ray, and enters an optional hard coating layer 730, which may for example be polycarbonate or other suitable material, again perhaps undergoing some amount of refraction. At a point 714 the ray encounters an interface between the hard coating 730 and the surrounding air 732 and is reflected at an equal and opposite angle. The reflection at ray reflection point 714 may correspond to a mechanism typically referred to as total internal reflection (TIR). The reflection typically arises from the acute angle of the beam and the contrast in indices of refraction between the surface of material 730 and the surrounding air 732. Alternatively, the surface of layer 730 may include a mirror surface.

After reflection the beam again passes through the hard coating material 730 and the polarization rotator 702. The polarization rotator 702 again rotates the beam, for example from circularly polarized to horizontally polarized as indicated by the concentric circles on the reflected beam 716. Alternatively, the hard coating layer 730 may be omitted and the double pass through the layer 702 may simply provide 90 degree rotation of the incoming beam 706 to produce a reflected beam 716. Alternatively, the reflection may be produced at the surface of the bulk material 728 and the surface may be treated to rotate the polarization, such as by applying a polarization rotating holographic element. Thus at each reflection from the walls of the image-guiding substrate 102, the polarization of the guided rays may be rotated.

FIG. 8 is a perspective view of an image-guiding substrate 801 that includes compound-angle input reflectors 110. The compound angle of the input reflectors 110 are here shown as plural reflectors. The compound angle may be used for example to add a bias to the launched rays to ensure none are launched straight down the substrate 102 with no reflections. Additionally or alternatively, the plural reflectors or one or more input reflectors with power may expand the vertical exit pupil. The function of the compound-angle input reflectors 110 may alternatively be performed by an input diffractive element 110'.

FIG. 9 is a schematic diagram of a display 901 including a scanned beam display engine 302 configured to provide an adjustable or variable accommodation scanned beam 304' into an image-guiding substrate. Light sources 306, 308, and 310 may be combined by a beam combiner 318, as previously described in conjunction with FIG. 3B, to produce a combined modulated beam 320. A variable collimation or variable focusing optical element 322' produces a variably shaped beam 324' that is scanned by the scanning mirror 326 as variably shaped scanned beam 304', which is launched down the image-guiding substrate 102 by the input mirror 110.

The variable collimation optical element 322' may be configured to produce a variable divergence or convergence angle (including, for example zero convergence or fully-collimated) of the beam 324', and hence the scanned beam 304'. According to some embodiments, the variable collimation optical element 322' may be set to a preferred amount of collimation that may be used for example to select an apparent image distance to from viewer or for example to adjust for diopter preferences of a user. This may be used, for example, to correct for vision imperfections such as near-sightedness, far-sightedness, or presbyopia. For such quasi-fixed beam shape embodiments, the variable collimation optical element 322' may optionally be of a type that is manually adjusted, such as by a thumb screw or by sliding in various lenses, or alternatively may be of a type that is electrically adjusted, such as by an electronic actuator controlled by the display controller for example (not shown).

Alternatively or additionally, the variable collimation optical element 322' may be embodied as a device for providing pixel-selective beam shape. Various approaches may be used to provide fast variation. Thus, in a pixel-selective beam shape embodiment, 3D information may be displayed using accommodation cues to represent the distance of various displayed elements.

FIG. 10 is a schematic diagram of a display 1001 having an image guiding substrate 102 that includes an ambient occlusion member 1002 configured for example on the opposite side of the image-guiding substrate 102 from the viewing region 114. According to one embodiment, the ambient occlusion member may be substantially opaque to reject ambient light behind the image projected to the viewer's eye 116. According to another embodiment, the ambient occlusion member 1002 may be a fixed attenuator such as a neutral density filter, sunglass lens, or polarizing lens to reduce the amount of ambient light in the viewing region 114 that might otherwise distract the viewer 116 or make the displayed image more difficult to see. According to another embodiment, the ambient occlusion member may be a variable attenuator to adapt to ambient lighting conditions. For example, the ambient occlusion member may comprise a photochromic material that darkens in bright conditions and lightens in darker conditions, thus maintaining desirable image viewing conditions over a range of ambient conditions. According to some embodiments the ambient occlusion member 1002 may be added or removed from the display 1001 as preferred by the viewer, such as by configuration as a snap-in or screw-on lens, etc. According to other embodiments, the member 1002 may be configured as a safety lens that may or may not include some amount of ambient light attenuation, according to the application preferences.

FIG. 11 is a schematic diagram of display 1101 including an image-guiding substrate 102 with an actively controlled ambient occlusion member 1002. The actively controlled ambient occlusion member 1002 may be of many types including for example an LCD panel, an electrochromic panel, etc. The ambient occlusion member 1002 may be driven by an occlusion controller 1102 that is responsive to an ambient light sensor 1104 and/or a manual control 1106. The occlusion controller 1102 may for example drive the ambient occlusion member 1002 via conventional dedicated leads, a bus, a wireless interface, etc., as indicated by the line 1108 in FIG. 11.

Several types of detectors 1104 may be appropriate, depending upon the application or configuration. For example, in one embodiment, the detector may include a PIN photodiode connected to an amplifier and digitizer. In one alternate embodiment, the detector 816 may comprise splitting and filtering to separate the ambient light into its component parts prior to detection. Depending upon the ratios of detected wavelengths, the controller 1102 may be programmed to infer certain environmental attributes such as "outdoor" or "indoor" lighting conditions. Such inferred attributes may optionally be used to determine an optimum amount of variable occlusion to which the variable occlusion member 1002 is driven.

As alternatives to PIN photodiodes, avalanche photodiodes (APDs) or photomultiplier tubes (PMTs) may be preferred for certain applications, particularly low light applications. In various approaches, photodetectors such as PIN photodiodes, APDs, and PMTs may be arranged to detect a large ambient region or alternatively to detect a smaller portion of the ambient region, such as a region corresponding to the (non-occluded) field-of-view of the viewer 116. In some embodiments, the photodetector 816 collects light through filters to eliminate any stray displayed image rays scattered from the image-guiding substrate 102.

Alternatively or additionally, the detector 1104 and controller 1106 may be used to adjust the brightness of the displayed image responsive to the ambient environment. For example, after detecting a high ambient brightness, the controller 1102, which may be integrated with the display engine controller, may send a command to the display engine to increase the image brightness to maintain readability. Similarly, in a low ambient brightness area, the displayed image brightness may be decreased to maintain a comfortable contrast between the projected image and the ambient illumination.

According to some embodiments, the user may manually toggle or select a brightness level and/or occlusion level using the user control 1106. Alternatively, image content may be used to determine an appropriate brightness/occlusion relationship. According to some embodiments, various portions of the occluding member 1002 may be selectively enabled, for example to provide enhanced displayed image readability in one portion of the image while maintaining user visibility of the surroundings in another portion. This may be done, for example by selectively coating photochromic materials or by selectively driving electrochromic or LCD portions of the occlusion member 1002.

In addition to straight image-guiding substrate shapes, the image-guiding substrate may include one or more folds 1202 as depicted in the display 1201 in FIG. 12. The display 1201 includes an angle-mapped display engine 302 or alternatively a location-mapped display engine 104 in conjunction with an ocular 106 to launch an image into an image-guiding substrate 102. After the image rays are launched into the substrate 102, they may be turned such as by reflection at a fold 1202 as indicated. The fold 1202 may alternatively be in the horizontal plane, the vertical plane, or may be a compound fold that folds the light path in both the vertical and horizontal planes. The image rays then proceed down the image-guiding substrate 102, optionally through one or more additional folds before being launched out to the viewing region 114 by output mirrors 112 (or an output diffractive element 112').

The fold 1202 may be at a number of angles. According to some embodiments, substantially every ray should undergo the same number and angle of reflections to avoid scrambling the image. For example, a reflective surface at 1202 should reflect every ray in the image and not allow any rays to bypass it such as by "cutting the corner" and reflecting only off the right sidewall of the forward-projecting portion and then off the front sidewall of the laterally projecting portion of the image-guiding substrate 102. This may be ensured for example by ray tracing the prospective substrate design. Similarly, according to the embodiment, when using plural folds, the substrate geometry and fold geometry should be maintained to ensure that all rays reflect the same number of times off equivalent surfaces.

According to some embodiments the rays do not necessarily need to reflect off equivalent surfaces in the same order. For example, the top surface of the forward-projecting portion of the image-guiding substrate 102 in FIG. 12 may be considered an equivalent surface to the top surface of the laterally-projecting portion. Thus, it may be allowable for certain rays reflect off the forward-projecting portion of the surface and other rays reflect off the laterally-projecting portion of the surface, while maintaining image integrity. Additionally or alternatively, embodiments may allow for all odd (or all even) reflections off equivalent surfaces, even if for example some rays reflect once and other rays reflect three times. Such an example of allowing combinations of all odd or all even reflections may be seen in the example of FIG. 7.

According to another embodiment, the image generated by the display engine assembly 302 or 104 and 106 may be adjusted to account for non-uniform reflections and/or the viewing area 114 may be masked to reduce or prevent the incidence of scrambled image portions.

FIG. 13 is a top view of the display 1201 having an image-guiding substrate with a fold of FIG. 12 showing more clearly how the image guiding substrate 102 may be conveniently folded to fit a desired shape, such as for example to wrap around the temple of the viewer 116.

While the folds illustrated by FIGS. 12 and 13 are shown as single folds, such folds may include a plurality of folds and/or folds that are distributed over a distance along the image-guiding substrate. For example, a fold may include a plurality of partially reflecting surfaces, a holographic optical element, photonic crystal, or other element operative to modify the transmission axis of the image-carrying rays. It may be preferable for a fold or series of folds to maintain the relative phase of the guided rays.

An image guided by an image-guiding substrate may generally comprise rays of light at a plurality of angles, wherein the angles map the image. In at least some embodiments, the rays may pass through nodes as they propagate along the image-guiding substrate, the nodes being regions where the rays closely approach one another in at least one axis. In some embodiments, folds may be placed at distances along the image-guiding substrate corresponding to node locations. Such an arrangement may provide an easier design solution, reduced fold size, looser tolerance for substrate lateral dimensions (especially near and at the fold), reduce the necessity of vignetting or masking the output image, improve the output image location tolerance, etc.

FIG. 14 is a side view of a display embodiment 1401 including an image-guiding substrate configured as a relatively large display such as a desk-top display or a heads-up display. For such an application, an exposed portion of an image-guiding substrate 102 may be arranged, and a viewing depth selected, to allow a viewer 116 to see the image projected from the image-viewing region 114 at some distance. The particular range of distances may be selected according to field-of-view preferences—closer distances subtending a larger distance and therefore being capable of providing a larger field-of-view to the viewer 116. The display engine (not shown) and optionally one or more folded portions of the image-guiding substrate may be house in a base 1402. In the case of a heads-up display, for example, the base may comprise the dashboard of an aircraft or motor vehicle. An embodiment such as the display 1401 may optionally include a fully occluding member on the back of the image-guiding substrate 102 covering all or a portion of the substrate, or alternatively may include a partially occluding member, a variably occluding member, or no occlusion, depending on user and application preferences.

Figure 15:
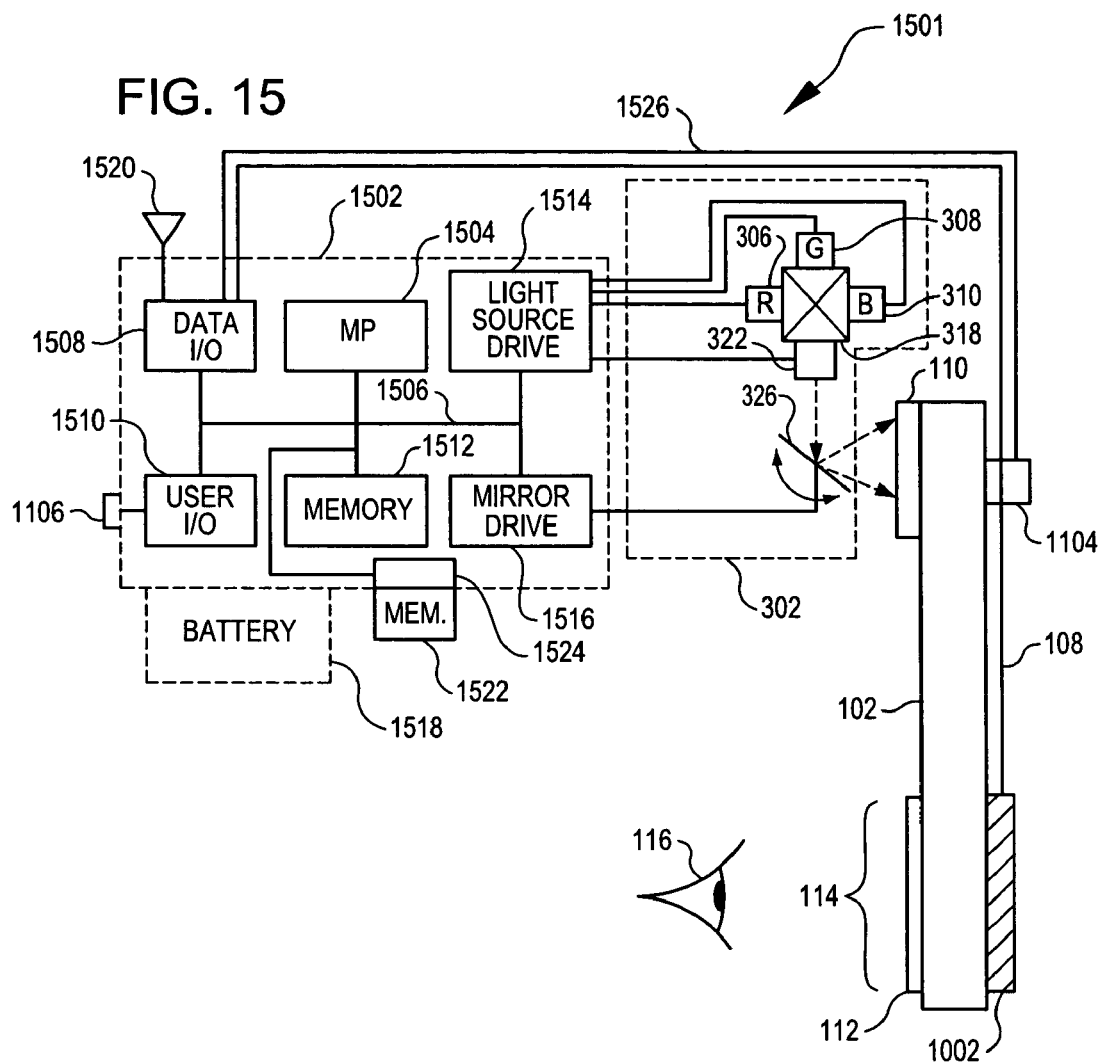
FIG. 15 is a block diagram of a display having a scanned beam display engine and an image-guiding substrate according to an embodiment.

FIG. 15 is a block diagram of a display 1501 showing relationships between a scanned beam display engine 302 and a controller 1502 with other system components. According to one embodiment, the controller includes a microprocessor 1504 coupled via a bus 1506 to other controller components that may include one or more data interfaces 1508, one or more user interfaces 1510, memory 1512 that may include several different types, a light source drive module 1514, and a mirror drive module 1516. The system may further include one or more batteries 1518 or other power sources such as an AC converter, a fuel cell, etc. The data interface 1508 may include an interface to a computer, a network, etc., including via a radio interface with an antenna 1520. One type of data received via the interface 1508 may include display data such as video data or HTML data for processing to form an image. Alternatively or additionally, the controller may include an internal image source (not shown) such as a solid state image source, a hard drive, a CD or DVD drive, etc. Additionally, an external memory device 1522 may be coupled via a socket 1524 or other interface to provide embedded program material, image source material, etc. The data interface 1508 may also include one or more interfaces to peripheral controls and actuators such as for example cabling 108 to an active variable occlusion device 1002, cabling 1526 to an ambient light sensor 1104, etc.

The user interface 1510 may include a number of controls such as, for example, a control 1106 to control the brightness delivered by the display engine 302 or the or amount of occlusion provided by the variable occlusion device 1002, as described earlier. Furthermore, the user interface 1510 may include other display or computer control and monitoring devices and systems such as but not limited to a joy stick, a mouse or trackball, a puff-sensitive navigation device, a microphone such as with voice recognition capabilities, a camera such as a bore-sighted camera, a selector to select image content, a timer reset, an altimeter reset and altimeter, an audio card and speaker or headphone output, and a keyboard. Additionally, an external user I/O device such as a remote control, cellular phone etc. may be coupled to the controller 1502 through the user interface 1510 and/or the data interface 1508.

When the controller 1502 receives one or a series of images for display, it may be advantageous to buffer the input images in memory. The micro processor may then process the image to convert it to a display resolution or pixel pattern corresponding to the scan pattern of the display engine 302. The image may further be gamma-corrected and otherwise processed to derive light source grayscale values and may optionally be inverted or otherwise processed to adapt the image to a see-through environment.

The image is parsed to the light source drive module 1514 as digital grayscale values such as RGB or chrominance/luminance values. The light source drive module 1514 sequentially drives digital-to-analog converters (DACs) (including, in some embodiments, RAMDACs) and amplifiers to drive the light sources 306, 308, and 310 of the display engine 302. Simultaneously, the mirror drive module 1516 drives the mirror actuators, typically through a DAC and amplifier, to cause the mirror 326 to scan in two dimensions. One or more synchronization signals may be returned from the mirror and/or optical detectors to determine mirror phase. The light sources 306, 308 and 310 are driven synchronously with the mirror phase to sequentially illuminate the light sources to an appropriate brightness (as determined by the video image) for the pixel corresponding to the sequence of instantaneous mirror positions.

As described above, the light source beams may be combined by a beam combiner 318 and the composite beam shaped bye a beam shaping optic 322 prior to launching toward the scan mirror 326. The beam shaping optic 322 may include a fixed degree of collimation, a selectable degree of collimation, or a completely variable degree of collimation. For variable collimation, such as for producing a displayed image with variable accommodation for 3D depth cues, it may be advantageous to drive the variable beam shaping optic 322 from the light source drive module 1514, which drives the variable beam shaping optic 322 to produce a shape corresponding to a z-axis "position" of a given pixel.

The scanned beam display engine 302 scans an input optical element 110, which may for instance be a diffractive optical element (I.e. a holographic optical element) or an input mirror. The input optical element 110 launches the rays down the image-guiding substrate 102. The rays are collected and launched into a viewing region 114 for viewing by a viewer's eye 116 by one or more output optical elements 112.

The display 1501 may be embodied as monochrome, monochrome with grayscale, full-color with grayscale, etc. In some embodiments, it may also be desirable to add color channels between the conventional RGB channels used for many color displays. One such example is described above. Alternatively, multiple color channels need not necessarily be accompanied by wavelength-sensitive output mirrors. Herein, the term grayscale and related discussion shall be understood to refer to each of these embodiments as well as other methods or applications within the scope of the invention. In the control apparatus and methods described below, pixel gray levels may comprise a single value in the case of a monochrome system, or may comprise an RGB triad or greater. Control may be applied individually to the output power of particular channels (for instance red, green, and blue channels) or may be applied universally to all channels, for instance as luminance modulation.

As may be readily appreciated, the controller 1502 of FIG. 15 may include a number of different hardware embodiments including but not limited to a programmable microprocessor, a gate array, an FPGA, an ASIC, a DSP, discrete hardware, or combinations thereof. The controller 1502 may further be embedded in a system that executes additional functions or may be spread across a plurality of subsystems.

The system of FIG. 15 may operate with monochrome data or with a plurality of wavelength channels. The controller 1502 may operate on RGB values or alternatively using chrominance/luminance or other color descriptor systems.

Although a scanned beam display engine is described in detail above, other display engine technologies such as LCD, LCOS, mirror arrays, CRT, etc. may be used in conjunction with an ocular lens as described above.

The major components shown in FIG. 15 may be distributed among a number of physical devices in various ways or may be integrated into a single device. For example, the controller 1502, display engine 302, and sensor 1104 may be integrated into a housing capable of coupling to a separate program source through a wired or wireless connector. According to another example, the program source may be a part of a larger system, for example an automobile sensor and gauge system, and the controller, display engine, and sensor integrated as portions of a heads-up-display. In such a system, the controller 1502 may perform data manipulation and formatting to create the displayed image.

FIG. 16 is a perspective drawing of a portable electronic device 1601, such as a cellular phone for example, having a display with a fold-out image-guiding substrate 102. According to the example, the image-guiding substrate folds out to expose a viewing region 114 that may provide a private and/or high resolution display image.

The preceding overview, brief description of the drawings, and detailed description describe illustrative embodiments according to the present invention in a manner intended to foster ease of understanding by the reader. Other structures, methods, and equivalents may be within the scope of the invention. The scope of the invention described herein shall be limited only by the claims.

The invention claimed is:

1. An image-guiding substrate comprising:
   an image output portion including a plurality of mirrors configured to receive propagated rays and launch the propagated rays toward a viewing region, each mirror having a partial reflectivity of $(1/Y)*[1/(X+1)]$, wherein X is the number of mirrors remaining to be traversed by a portion of a ray not launched by the mirror and 1/Y is an occlusion.

2. The image-guiding substrate of claim 1 wherein Y is about 1, corresponding to a fully occluded viewing region.

3. The image-guiding substrate of claim 1 wherein Y is about 2, corresponding to an occlusion of about 0.5.

4. The image-guiding substrate of claim 1 wherein at least one of the mirrors includes a partial broadband reflector.

5. The image-guiding substrate of claim 1 wherein at least one of the mirrors includes a polarization-selective reflector.

6. The image guiding substrate of claim 1 wherein at least one of the mirrors includes a partial broadband reflector and a polarization-selective reflector.

7. The image-guiding substrate of claim 1 wherein at least one of the mirrors includes an angle-selective reflector.

8. The image-guiding substrate of claim 1 wherein at least one of the mirrors includes a polarization-selective reflector configured to sort odd-reflection rays from even-reflection rays.

9. The image guiding substrate of claim 1 further comprising:
   substrate walls configured to rotate polarization 90 degrees each time a ray is reflected therefrom; and
   wherein at least one of the mirrors includes a polarization-selective reflector configured to sort odd-reflection rays from even-reflection rays.

10. A method for displaying an image with an image-guiding substrate having an output portion with a number of output mirrors Z, comprising:
    receiving a ray of light with the Wth mirror, wherein W is between 1 and Z, inclusive;
    reflecting about 1/(X+1) of the power of the ray of light toward a viewing region, wherein X=Z−W; and
    passing about 1−(1/(X+1)) of the power of the ray of light to the (W+1)th mirror, unless W=Z.

11. The method of claim 10 wherein the Wth mirror includes a partial broadband reflector.

12. The method of claim 10 wherein the Wth mirror includes a polarization-selective reflector.

13. The method of claim 10 wherein the Wth mirror includes a partial broadband reflector and a polarization-selective reflector.

14. The method of claim 10 wherein the Wth mirror includes an angle-selective reflector.

15. The method of claim 10 wherein the Wth mirror includes a polarization-selective reflector configured to sort odd-reflection rays from even-reflection rays.

16. The method of claim 10 further comprising:
    prior to receiving the ray of light with the Wth mirror, guiding the ray of light in an image-guiding substrate having walls configured to rotate polarization of the ray 90 degrees each time the ray is reflected therefrom; and
    wherein the Wth mirror includes a polarization-selective reflector configured to sort odd-reflection rays from even-reflection rays.

17. A system operable to provide a viewable image comprising:
    a controller operable to generate an electrical signal corresponding to a video image;
    a display engine operable to produce a video image responsive to receiving the electrical signal; and
    an image-guiding substrate aligned to receive the video image, the image-guiding substrate having an image output portion, the image output portion including a plurality of mirrors configured to receive propagated rays and launch the propagated rays toward a viewing region, each mirror having a partial reflectivity of (1/Y)[1/(X+1)], wherein X is the number of mirrors remaining to be traversed by a portion of a ray not launched by the mirror and 1/Y is an occlusion.

18. The system of claim 17 wherein the system includes a cellular telephone and the controller is operable to generate the electrical signal responsive to a received radio signal.

19. The system of claim 17 wherein the system includes a motor vehicle and the image-guided substrate is configured as a heads-up display.

20. The system of claim 17 wherein the system includes a television monitor and the image-guided substrate is configured as a flat panel display.

* * * * *